US006928383B2

(12) United States Patent
Fukushima et al.

(10) Patent No.: US 6,928,383 B2
(45) Date of Patent: Aug. 9, 2005

(54) THREE-DIMENSIONAL INFORMATION DETECTING SYSTEM, THREE-DIMENSIONAL INFORMATION DETECTING DEVICE AND INPUT DEVICE FOR THREE-DIMENSIONAL INFORMATION DETECTING SYSTEM

(75) Inventors: Masamitsu Fukushima, Saitama (JP); Yasuo Oda, Saitama (JP); Masamitsu Ito, Saitama (JP)

(73) Assignee: Wacom Co., Ltd., Saitama-ken (JP)

( * ) Notice: Subject to any disclaimer, the term of this patent is extended or adjusted under 35 U.S.C. 154(b) by 0 days.

(21) Appl. No.: 10/736,780

(22) Filed: Dec. 17, 2003

(65) Prior Publication Data

US 2004/0181360 A1 Sep. 16, 2004

(51) Int. Cl.[7] ........................ G01C 17/00; G01C 19/00; G01C 9/00; G06F 15/00

(52) U.S. Cl. ........................ 702/153; 702/167; 702/168; 342/448

(58) Field of Search ................................ 702/153, 167, 702/168; 342/448

(56) References Cited

U.S. PATENT DOCUMENTS 3,868,565 A * 2/1975 Kuipers ................. 324/207.26
4,577,057 A * 3/1986 Blesser ..................... 178/19.01
4,613,866 A * 9/1986 Blood ........................ 342/448
4,845,503 A * 7/1989 Adam et al. ................ 342/448
5,592,401 A * 1/1997 Kramer ....................... 702/153
5,693,914 A * 12/1997 Ogawa ..................... 178/18.07
5,930,741 A * 7/1999 Kramer ....................... 702/153
6,242,907 B1 * 6/2001 Clymer et al. .......... 324/207.17
6,316,934 B1 * 11/2001 Amorai-Moriya et al. ...................... 324/207.17
6,380,732 B1 * 4/2002 Gilboa .................. 324/207.17
6,418,280 B2 * 7/2002 Kamiya ........................ 399/46
6,433,781 B1 * 8/2002 Oda et al. .................... 345/167
6,487,516 B1 * 11/2002 Amorai-Moriya ........... 702/152
6,519,550 B1 * 2/2003 D'Hooge et al. ........... 702/167
6,615,155 B2 * 9/2003 Gilboa ....................... 702/150
6,691,074 B1 * 2/2004 Moriya et al. .............. 702/190
2003/0142073 A1 * 7/2003 Fukushima et al. ......... 345/158

* cited by examiner

*Primary Examiner*—Michael Nghiem
*Assistant Examiner*—Anthony T. Dougherty
(74) *Attorney, Agent, or Firm*—Berenato, White & Stavish, LLC

(57) ABSTRACT

A motion capture system includes a motion capture detecting device with sensor coils that are sequentially selected by a control section. Signals are communicated between respective input coils of input elements of an input device and the sensor coils by electromagnetic coupling. The signals received by each of the selected coils are detected by a detecting section. Three-dimensional coordinates and directions of each of the input elements are calculated by a control section so that the input elements become continuous, based on the detected signals by the detecting section.

41 Claims, 27 Drawing Sheets

| QUADRANTS | LUx1 | LUy1 | LUx1+LUx2 |
|---|---|---|---|
| 1 | + | + | + |
| 2 | − | + | + |
| 3 | − | − | + |
| 4 | + | − | + |
| 5 | + | + | − |
| 6 | − | + | − |
| 7 | − | − | − |
| 8 | + | − | − |

| \|LUxs2\| −\|LUxs1\| | \|LUx's2\| −\|LUx's1\| | \|LUys2\| −\|LUys1\| | \|LUy's2\| −\|LUy's1\| | AZIMUTH REGIONS | ANGLES TO BE ADDED |
|---|---|---|---|---|---|
| + | + | + | − | 1 | 0 |
| + | + | + | + | 2 | 90 |
| − | + | + | + | 3 | 90 |
| − | − | + | + | 4 | 180 |
| − | − | − | + | 5 | 180 |
| − | − | − | − | 6 | 270 |
| + | − | − | − | 7 | 270 |
| + | + | − | − | 8 | 360 |

| $\phi s$ (DEGREES) | $\phi_0$ (DEGREES) | sign((Xwidth25_left/right)-1) | sign((Ywidth25_left/right)-1) | QUADRANTS | $\phi$ | $\phi$ (DEGREES) |
|---|---|---|---|---|---|---|
| 0 | 6.3 | 1 | 1 | 1 | $\phi=\phi_0$ ($\phi=\phi_0+360$) | 6.3 |
| 15 | 17.7 | 1 | 1 | 1 | | 17.7 |
| 30 | 32.1 | 1 | 1 | 1 | | 32.1 |
| 45 | 47 | 1 | 1 | 1 | | 47 |
| 60 | 65 | 1 | 1 | 1 | | 65 |
| 75 | 80.9 | 1 | 1 | 1 | | 80.9 |
| 90 | -87 | -1 | 1 | 2 | $\phi=\phi_0+180$ | 93 |
| 105 | -69.4 | -1 | 1 | 2 | | 110.6 |
| 120 | -61.3 | -1 | 1 | 2 | | 118.7 |
| 135 | -51.1 | -1 | 1 | 2 | | 128.9 |
| 150 | -36.8 | -1 | 1 | 2 | | 143.2 |
| 165 | -17.5 | -1 | 1 | 2 | | 162.5 |
| 180 | 5.2 | -1 | -1 | 3 | | 185.2 |
| 195 | 23.3 | -1 | -1 | 3 | | 203.3 |
| 210 | 40.5 | -1 | -1 | 3 | | 220.5 |
| 225 | 51.6 | -1 | -1 | 3 | | 231.6 |
| 240 | 58.1 | -1 | -1 | 3 | | 238.1 |
| 255 | 73.7 | -1 | -1 | 3 | | 253.7 |
| 270 | -82.9 | 1 | -1 | 4 | $\phi=\phi_0+360$ | 277.1 |
| 285 | -63.6 | 1 | -1 | 4 | | 296.4 |
| 300 | -49.8 | 1 | -1 | 4 | | 310.2 |
| 315 | -38 | 1 | -1 | 4 | | 322 |
| 330 | -26.3 | 1 | -1 | 4 | | 333.7 |
| 345 | -13.4 | 1 | -1 | 4 | | 346.6 |
| 360 | 3.2 | 1 | 1 | 1 | $\phi=\phi_0+360$ | 363.2 |

THREE-DIMENSIONAL INFORMATION DETECTING SYSTEM, THREE-DIMENSIONAL INFORMATION DETECTING DEVICE AND INPUT DEVICE FOR THREE-DIMENSIONAL INFORMATION DETECTING SYSTEM

CROSS-REFERENCE TO RELATED APPLICATION

This application is claims priority to Japanese application number 2002-366386, filed Dec. 18, 2002, the disclosure of which is incorporated herein by reference and priority to which is claimed pursuant to 35 U.S.C. § 119.

BACKGROUND OF THE INVENTION

1. Field of the Invention

The present invention relates to a three-dimensional information detecting system for detecting three-dimensional information about a position, directions and the like of an input device in a three-dimensional space, a three-dimensional information detecting device for detecting three-dimensional information about the aforementioned input device in the above-described three-dimensional information detecting system, and an input device for the three-dimensional information system for inputting three-dimensional information in the three-dimensional information detecting system. The three-dimensional information systems include a motion capture system for detecting position information about a plurality of input elements that are connected with each other. A detecting device for the motion capture corresponds to the three-dimensional information detecting device, and an input device for the motion capture corresponds to the input device for three-dimensional information detecting system.

2. Description of the Related Art

To date, three-dimensional information detecting systems, such as motion capture systems, that digitally capture human motion and the like, and that reproduce them on a computer, have been developed to apply to various fields including medical care, sports, games, etc. (see patent documents such as Japanese Unexamined Patent Application Publication Nos. 2000-132323, 2000-231638, and 2000-321044)

Prior art motion capture systems include optical types and mechanical types.

For example, an optical type motion capture system is arranged to attach light-reflectors such as mirrors to a human joints, and detects, by sensors, reflected light from the light-reflectors that occurs when a person moves in a darkroom, thereby reading human motion. On the other hand, a mechanical type motion capture system is arranged to detect human motion and read them by using a plurality of rotary encoders.

Inputting outputs of the motion capture system into a computer allows images displayed on the computer to be moved in correspondence with human motion, or enables the observation of human motion.

Optical type motion capture systems require a darkroom or the like, and so the system becomes large and expensive.

On the other hand, a mechanical type motion capture system requires a large number of rotary encoders, and so becomes complicated, expensive and susceptible to equipment failure.

SUMMARY OF THE INVENTION

Accordingly, it is an object of the present invention to provide a motion capture system that is inexpensive, reliable and capable of high-accuracy detection.

It is another object of the present invention to provide a motion capture detecting device that is inexpensive, reliable and capable of high-accuracy detection.

It is still another object of the present invention to provide a motion capture input device suitable for a motion capture system that is inexpensive, reliable and capable of high-accuracy detection.

The aforesaid objects are achieved individually and in combination, and it is not intended that the present invention be construed as requiring two or more of the objects to be combined unless expressly required by the claims attached hereto.

In a first embodiment, a three-dimensional information detecting system in accordance with the present invention includes a plurality of input elements each of which has at least one input coil, and which is connected with each other so as to be relatively movable; a plurality of sensor coils that is disposed along a detection surface so as to intersect each other, and each of which is electromagnetically coupled to a respective one of the input coils; a selector for selectively switching the sensor coils; a signal generator for generating signals to be communicated between the input coil and the selected sensor coil, by electromagnetic coupling; a signal detecting section for detecting signals received by each of the selected sensor coils or each of the input coils; and a calculator for calculating coordinates and directions of each of the plurality of input elements in a three-dimensional space, based on the detection signals detected by the signal detecting section.

The plurality of sensor coils disposed along the detection surface so as to intersect each other is electromagnetically coupled to input coils of the input elements. The selector selectively switches the sensor coils. The signal generator generates signals to be communicated between each of the input coils and a respective one of the selected sensor coils, by electromagnetic coupling. The signal detecting section detects signals received by the selected sensor coil or the input coil. The calculator calculates three-dimensional coordinates and directions of each of the plurality of input elements, based on the detection signals detected by the signal detecting section.

Here, the above-described calculator may be arranged to calculate an X-axis coordinate and a Y-axis coordinate of each of the input elements, based on signals at at least three points in the vicinity of the peak value of detection signals corresponding to each of the input elements and detected by the detecting section, and also may be arranged to determine a height of each of the input elements from the width of a signal distribution at a predetermined level value of the detection signals.

The calculator may be arranged to determine a tilt angle $\theta$ and an azimuth angle $\phi$ of each of the input elements, based on the relationship between detection signals corresponding to each of the input elements, the detection signals having been detected by the detecting section.

The calculator may be arranged to determine a tilt angle $\theta$ and an azimuth angle $\phi$ of each of the input elements, based on the sub-signal ratio of detection signals corresponding to each of the input elements.

The calculator may be arranged to determine a tilt angle $\theta$ and an azimuth angle $\phi$ of each of the input elements, based on the ratio of the left/right half side widths of detection signals corresponding to each of the input elements.

The calculator may be arranged to correct the detected X-axis coordinate, Y-axis coordinate, and height of each of the input elements, by using the tilt angle θ and the azimuth angle ϕ that have been determined.

Based on the coordinates of any one of the plurality of input elements, the calculator may be arranged to calculate coordinates of each of the other input elements.

The calculator may be arranged to cause the coordinates of the end of the aforesaid one of the plurality of input elements to conform to the coordinates of the end of another input element connected to the aforesaid input element.

The three-dimensional information detecting system according to the present invention may further include a plurality of oblique sensor coils that is disposed so as to intersect each other and also intersect the above-described sensor coils.

The above-described input element may be arranged to have one input coil.

Alternatively, the input element may be arranged to have a plurality of input coils.

The above-described plurality of input coils may be arranged to be disposed so that the central axes thereof orthogonally intersect each other.

The plurality of input coils may be arranged to be disposed so that the central positions thereof conform to each other.

At least one of the plurality of input coils may be disposed so that the central position thereof deviates from those of the other input coils.

At least one of the input elements may have a sphere, and the aforesaid input coil may be disposed within the sphere.

At least one of the input coils may be wound around a magnetic material.

The present three-dimensional information detecting system may be arranged so that the above-described signal generator generate signals of a plurality of frequencies corresponding to the respective input coils, and that signals of mutually different frequencies are communicated between each of the input coils and a respective one of the selected sensor coils.

The present three-dimensional information detecting system may be arranged so that signals are transmitted from each the input coils by supplying currents to each of the input coils from the signal generator, and that the detecting section detects the signals generated in each of the sensor coils.

The present three-dimensional information detecting system may be arranged so that signals are transmitted from each of the sensor coils by supplying currents to each of the sensor coils from the signal generator, and that the detecting section detects the signals generated in each of the above-described input coils.

The present three-dimensional information detecting system may be arranged so that signals are transmitted from each of the sensor coils by supplying currents to a respective one of the sensor coils from the signal generator, that, after having received the signals, each of the input coils sends back the signals to a respective one of the sensor coils, and that the detecting section detects the signals received by each of the sensor coil.

In another aspect, the present invention provides a three-dimensional information detecting device. This three-dimensional information detecting device includes a plurality of sensor coils that is disposed along a detection surface so as to intersect each other, and that is electromagnetically coupled to input coils of a plurality of input elements; a selector for selectively switching the sensor coils; a signal generator for generating signals to be communicated between each of the input coils and a respective one of the selected sensor coils, by electromagnetic coupling; signal detecting section for detecting signals generated by the signal generator and received by each of the selected sensor coils or each of the input coils; and a calculator for calculating coordinates and directions of each of the input elements in a three-dimensional space, based on the signals detected by the signal detecting section.

The plurality of sensor coils disposed along the detection surface so as to intersect each other is electromagnetically coupled to input coils of the input elements. The selector selectively switches the sensor coils. The signal generator generates signals to be communicated between each of the input coils and a respective one of the selected sensor coils, by electromagnetic coupling. The signal detecting section detects signals received by each of the selected sensor coils or each of the input coils. The calculator calculates three-dimensional coordinates and directions of the each of the plurality of input elements, based on the detection signals detected by the signal detecting section.

Here, the calculator may be arranged to determine an X-axis coordinate and a Y-axis coordinate of each of the input elements, based on signals at at least three points in the vicinity of the peak value of the detection signals corresponding to each of the input elements and detected by the detecting section, and also may be arranged to determine a height of each of the input elements from the width of a signal distribution at a predetermined level value of the detection signals.

The calculator may be arranged to determine a tilt angle θ and an azimuth angle ϕ of each of the input elements, based on the relationship between the detection signals corresponding to each of the input elements, the detection signals having been detected by the detecting section.

The calculator may be arranged to determine a tilt angle θ and an azimuth angle ϕ of each of the input elements, based on the sub-signal ratio of detection signals corresponding to each of the input elements.

The calculator may be arranged to determine a tilt angle θ and an azimuth angle ϕ of each of the input elements, based on the ratio of the left/right half side widths of detection signals corresponding to each of the input elements.

The calculator may be arranged to correct the detected X-axis coordinate, Y-coordinate, and height of each of the input elements, by using the tilt angle θ and azimuth angle ϕ that have been determined.

Based on the coordinates of any one of the plurality of input elements, the calculator may be arranged to calculate the coordinates of each of the other input elements.

The calculator may be arranged to causes the coordinates of the end of the aforesaid one of the plurality of input elements to comfort to the coordinates of the end of another input element connected to the aforesaid input element.

The present three-dimensional information detecting device may further include a plurality of oblique sensor coils that is disposed so as to intersect each other and also intersect the above-described sensor coils.

In still another aspect, the present invention provides an input device for a three-dimensional information detecting system. This three-dimensional information input device includes input coils for each communicating signals with a respective one of a plurality of sensor coils by electromagnetic coupling, and a plurality of input elements that is connected with each other so as to be relatively movable.

The plurality of input elements has input coils each of which communicates signals with a respective one of the plurality of sensor coils by electromagnetic coupling, and they are connected with each other so as to be relatively movable.

The above-described input element may be arranged to have one input coil.

Alternatively, the input element may be arranged to have a plurality of input coils.

The above-described plurality of input coils may be arranged to be disposed so that the central axes thereof orthogonally intersect each other.

The plurality of input coils may be arranged to be disposed so that the central positions thereof conform to each other.

At least one of the plurality of input coils may be disposed so that the central position thereof deviates from those of the other input coils.

At least one of the input elements may have a sphere, and the aforesaid input coil may be disposed within the sphere.

Each of the input coils may be arranged to be wound around a magnetic material.

The present input device for a three-dimensional information detecting system may further include a plurality of resonant capacitors connected to the respective input coils, the resonant capacitors each constituting a resonant circuit having different frequencies form each other.

The present input device for a three-dimensional information detecting system may further include a plurality of serial resonant circuits serially connected to the respective resonant circuits and having the same resonant frequencies as those of the respective corresponding resonant circuits.

The present input device for a three-dimensional information detecting system may further include a transmitted signal generating circuit, whereby an output signal of the oscillation circuit is outputted from each of the input coils corresponding to a respective one of the aforesaid serial resonant circuits through the serial resonant circuit.

The present input device for a three-dimensional information detecting system may further include a battery for supplying a driving power to the aforesaid transmitted signal generating circuit.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENTS

A three-dimensional information detecting system, a three-dimensional information detecting device, and an input device for the three-dimensional information according to the present invention is described with reference to the accompanying drawings. In embodiments of the present invention described below, as examples of the three-dimensional information detecting system, the three-dimensional information detecting device, and the input device for the three-dimensional information input device, a motion capture system, a motion capture detecting device, and a motion capture input device are described, respectively. For convenience in writing, as symbols in mathematical expressions or the like used in the embodiments, symbols with an underbar (e.g., "LUxm_dev") and symbols without underbar (e.g., "LUxm") are both used. Symbols with an underbar are equal to otherwise similar symbols lacking an underbar, and are treated as the same symbol irrespective of the presence or absence of an underbar.

Selected reference data (e.g., characteristic data and data for correction) to which reference is made when calculating coordinates and directions of each of the plurality of input elements in a three-dimensional space is stored in a memory 204 in advance.

Figure 1:
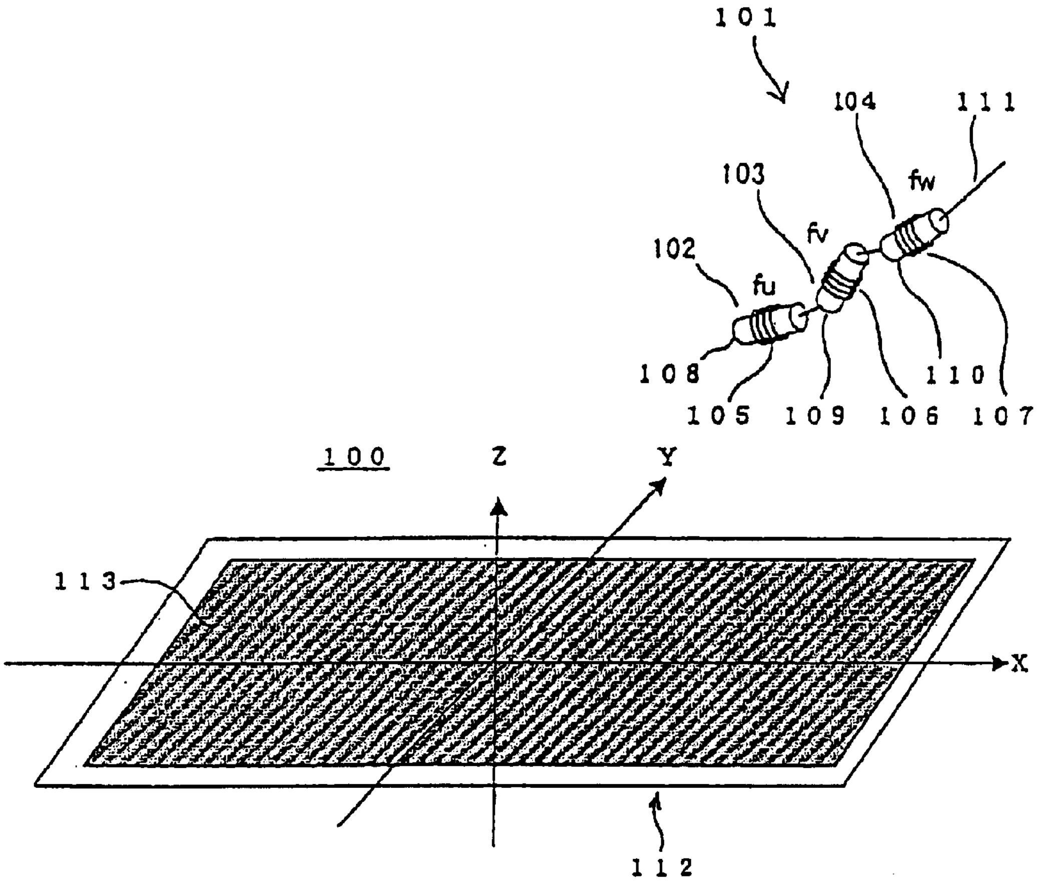
FIG. 1 is a schematic view of the overall configuration of a first embodiment according to the present invention.

FIG. 1 is a schematic perspective view showing the configuration of a motion capture system according to a first embodiment of the present invention.

Referring to FIG. 1, the motion capture system 100 according to the first embodiment includes a motion capture input device 101 for inputting information about human motion and the like; and a motion capture detecting device 112 for detecting coordinates and directions in a three-dimensional space, of each of a plurality of input elements constituting the motion capture input device 101.

The motion capture input device 101 comprises a plurality of input elements for motion capture as input means. The motion capture input device 101 is a device for inputting coordinates and directions in a three-dimensional space, of each of the plurality of input elements that are connected with each other. In the first embodiment, an example of the motion capture input device 101 having three input elements 102 to 104 is shown, but two or more (i.e., plural) input elements may be appropriately employed in accordance with use. Opposite ends of input elements 102 to 104 are connected to each other so as to be relatively movable by connecting members such as ball joints. Herein, the connection of the opposite ends of the input elements are performed so that the connected opposite ends conform to each other. Also, the plurality of input elements 102 to 104 are linked in a chain shape. However, for purposes of explanation, these input elements are depicted as being separated from one another in FIG. 1 and FIG. 2, which is shown below.

The input element 102 has a core 108 formed of a magnetic material and an input coil 105 wound around the core 108. The input element 103 has a core 109 formed of a magnetic material and an input coil 106 wound around the core 109. Also, the input element 104 has a core 110 formed of a magnetic material and an input coil 107 wound around the core 110. Hereinafter, each of the input coils 105 to 107 is referred to as a "pen coil" as required, and detection signal obtained by receiving from each of the input coils 105 to 107 is referred to as a "pen signal" as required.

The input coils 105 to 107, respectively, are wound around the cores 108 to 110, centered at the central portions (barycentric positions) of the input elements 102 to 104, and are connected to the motion capture detecting device 112 through a cable 111, as described below.

On the other hand, the motion capture detecting device 112 has a plurality of sensor coils 113, as second coils, that are disposed so as to orthogonally intersect each other (in the first embodiment of the present invention, they are disposed along the X-axis and Y-axis directions), over the entire region of a detection surface (the surface facing the input device 101), which is a flat top surface of the detecting device 112.

Figure 2:
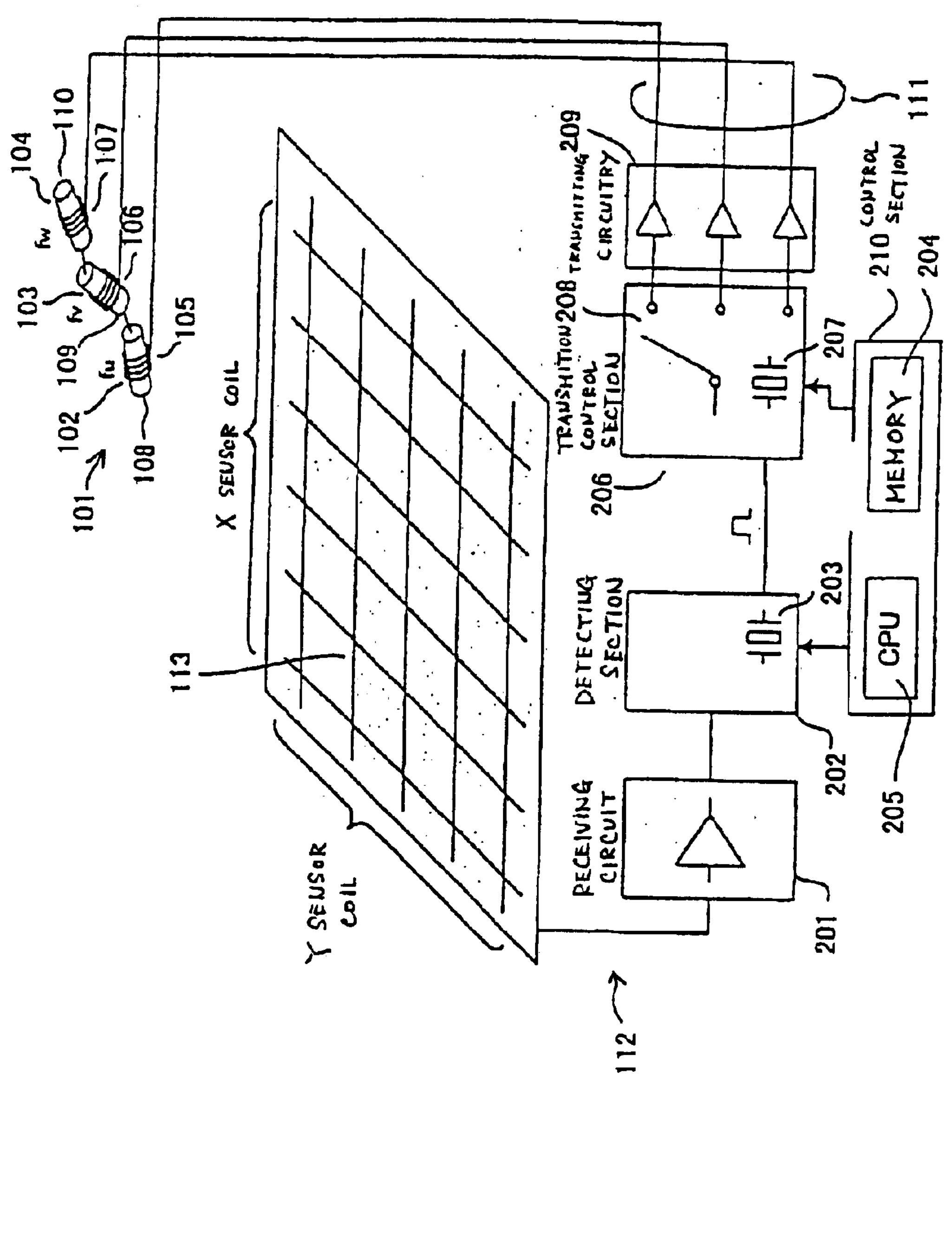
FIG. 2 is a block diagram of a motion capture system according to the first embodiment.

FIG. 2 is a block diagram of the motion capture system 100 shown in FIG. 1.

Referring to FIG. 2, the plurality of sensor coils 113 comprises a plurality of sensor coils (X sensor coils) arranged side by side along the X-axis direction, and a plurality of sensor coils (Y sensor coils) arranged side by side along the Y-axis direction. The plurality of sensor coils 113 is connected to a detecting section 202 constituting signal detecting means, through a receiving circuit 201 having an amplifier circuit.

The detecting section 202 includes a detector circuit 203 that detects signals of plural kinds of frequencies (in the first embodiment, these signals are of frequencies fu, fv, and fw) for detecting received signals.

A transmission control section 206 constituting signal generating means includes a transmitted signal generating circuit 207 that generates signals of a plural kinds of frequencies (in the first embodiment, these signals are of frequencies fu, fv, and fw), and a selector circuit 208 for selectively switching, at a predetermined time, signals generated by the transmitted signal generating circuit 207, and outputting the selected signal to a transmitting circuitry 209. The transmitting circuitry 209 has an amplifier circuit, and the output sections thereof are connected to the respective corresponding coils 105 to 107 in the input device 101 through respective signal cables 111, which comprise a plurality of signal cables.

Figure 4:
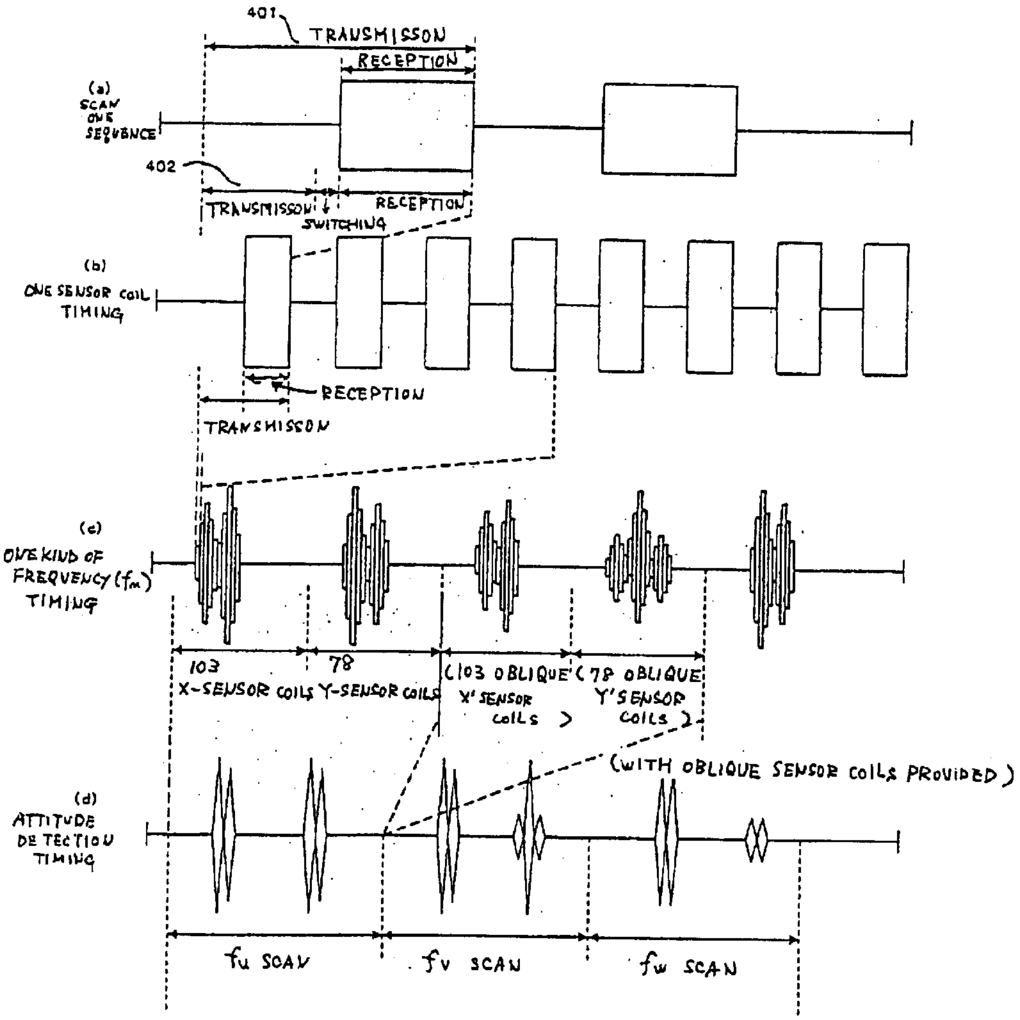
FIGS. 4A to 4D are timing charts showing an example of transmission and reception of signals according to the first embodiment.

Three kinds of signals of frequencies fu, fv, and fw may be arranged to be simultaneously transmitted. When three kinds of signals of frequencies fu, fv, and fw are arranged to be simultaneously transmitted, the signal intensity of the frequency components fu, fv, and fw can be calculated by subjecting the signals received by the detection section 202 to processing such as a fast Fourier transform (FFT). When the three kinds of signals of frequencies fu, fv, and fw are simultaneously transmitted, scanning time illustrated in FIG. 4 (shown below) needs only time corresponding to a single frequency, thereby allowing the reduction in scanning time.

The detecting section 202 and the transmission control section 206 are interconnected for synchronization. The detecting section 202 and the transmission control section 206 are connected to, and controlled by a control section 210.

The control section 210 comprises the memory 204 for storing in advance various kinds of tables and processing programs as described below, and a central processing unit (CPU) 205 that performs various processings, such as the calculation processing with respect to three-dimensional coordinates and directions of the input device 101, selective control processing with respect to the sensor coils 113, and synchronous control processing with respect to the detecting section 202 and the transmission control section 206. The CPU 205 then executes an appropriate program stored in the memory 204, making reference to the aforementioned table, based on signals detected by the detection section 202. The sensor coils 113, the receiving circuit 201, the detecting section 202, the transmission control section 206, the transmitting circuitry 209, and the control section 210 are included in the detecting device 112.

Here, the control section 210 constitutes processing means; the memory 204 constitutes storage means; and the CPU 205 constitutes selecting means for performing selective control processing with respect to the sensor coils 113, the calculating means for calculating three-dimensional coordinates and directions (i.e., three-dimensional information) of the input device 101, and synchronous control means for performing synchronous control processing with respect to the detecting section 202 and the transmission control section 206.

Figure 3:
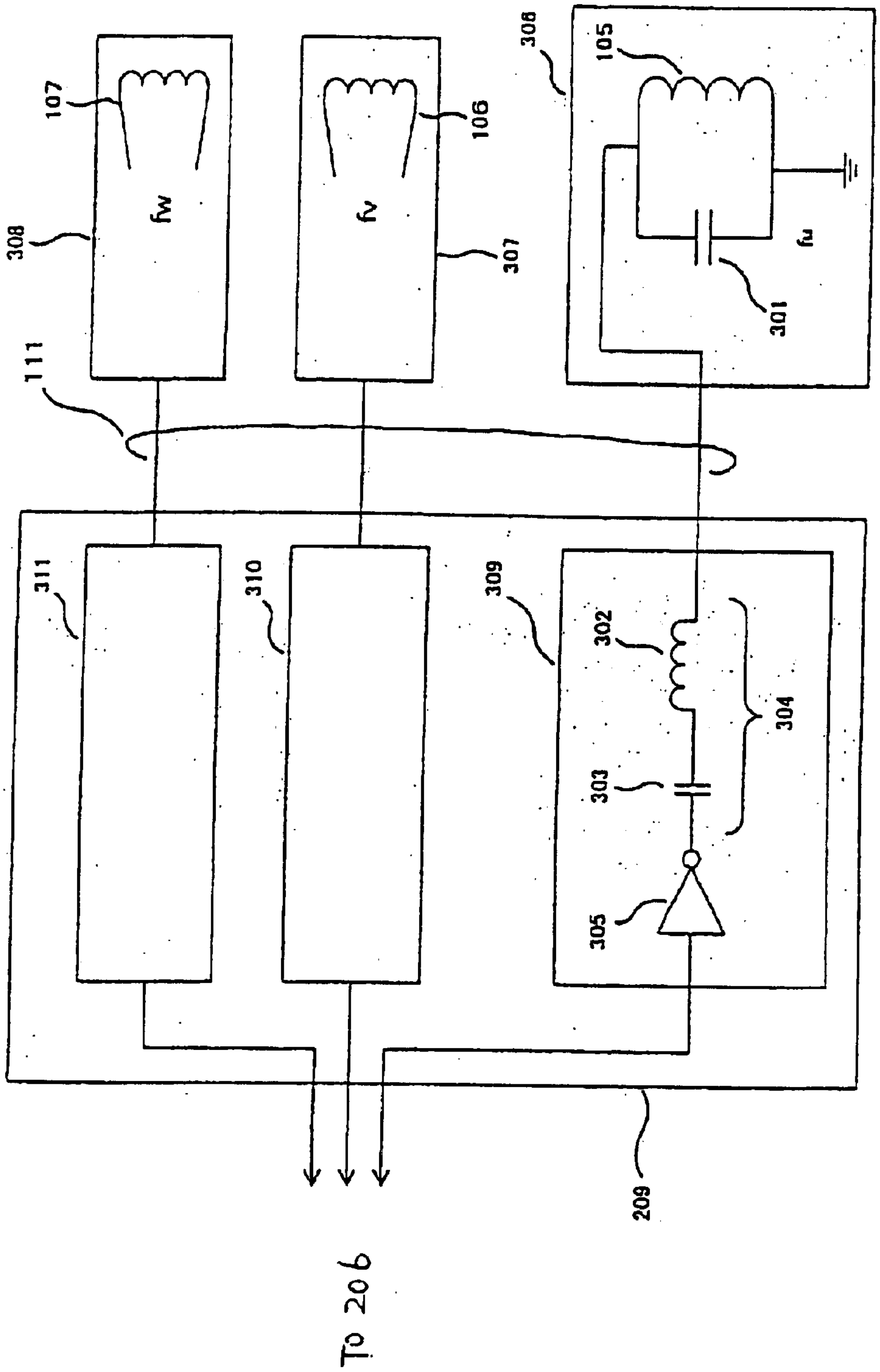
FIG. 3 is a block diagram of an input device for motion capture used in the first embodiment.

FIG. 3 is a block diagram showing the configuration of the input device 101. The same reference numerals designate the same parts as those in FIGS. 1 and 2.

The input elements 102 to 104 of the input device 101 have signal output circuits 306 to 308 including the input coils 105 to 107, respectively. The signal output circuits 306 to 308 are connected to the transmitting circuitry 209 through the respective signal cables 111.

With regard to the signal output circuits 306, a capacitor 301 is connected in parallel with the input coil 105, which is wound around the core 108 of a magnetic material. The input coil 105 and the capacitor 301 constitute a parallel resonant circuit having a resonant frequency fu. A transmitted signal output circuit 309 in the transmitting circuitry 209 is serially connected to the aforementioned parallel resonant circuit, comprising the input coil 105 and the capacitor 301, through the signal cable 111. The transmitted signal output circuit 309 includes a serial resonant circuit 304 having the resonant frequency fu, and comprising a coil 302 and a capacitor 303; and a buffer circuit 305 for outputting transmitted signals used to transmit signals from the motion capture input device 101.

The purpose of constituting the parallel resonant circuit using the coil 105 and the capacitor 301 is to increase the intensity of transmitted signals and that of received signals. The capacitor 301 is not necessarily required, but the coil 105 alone will suffice. However, when the input device 101 is of a type such that a signal is transmitted from the sensor coil to the input device 101, and that, after having been received by the input device 101, the signal is returned to and detected by the sensor coil, it is necessary to provide a parallel resonant circuit to the input device 101. As a result, a coil and a capacitor connected therewith in parallel become necessary.

The serial resonant circuit 304 serves as a filter. Specifically, the serial resonant circuit 304 is used for reducing the distortion of output signals and removing a direct current component thereof in the transmitted signal output buffer circuit 305 so as not to transmit useless currents (i.e., distortion of output signals or currents by voltage offset in the transmitted signal output buffer circuit 305) to the input device 101. Therefore, when the distortion of transmitted signals is small, the serial resonant circuit 304 is not necessarily required. The coil 302 may be omitted and only the coupling capacitor 303 for removing a direct current component may be used. If the transmission includes little direct current component, even the coupling capacitor 303 may be omitted.

The signal output circuits 307 and 308 each have a configuration similar to that of the signal output circuit 306. However, the signal output circuit 307 having the input coil 106 is different from the signal output circuit 306 in that a capacitor (not shown) is connected in parallel with the input coil 106, so as to constitute a parallel resonant circuit having a resonant frequency fv. Also, the signal output circuit 308 having the input coil 107 is different from the signal output circuit 306 in that a capacitor (not shown) is connected in parallel with the input coil 107, so as to constitute a parallel resonant circuit having a resonant frequency fw.

Transmitted signal output circuits 310 and 311 each have a configuration similar to that of the transmitted signal output circuit filter circuit 309. However, the transmitted signal output circuit 310 is different from the transmitted signal output circuit 309 in that a serial resonant circuit having a resonant frequency fv is provided. Also, the transmitted signal output circuit 311 is different from filter circuit 309 in that a serial resonant circuit having a resonant frequency fw is provided.

In this embodiment, the transmitted signal output circuits 309 to 311 are arranged to be included in the transmitting circuitry 209. However, the transmitted signal output circuits 309 to 311 may be arranged to be included in the signal output circuits 306 to 308, respectively.

FIGS. 4A to 4D are timing charts showing the operation of the first embodiment. In FIGS. 4A to 4D, an example is provided in which the sensor coils 113 comprise one hundred and three (103) X sensor coils arranged side by side along the X-axis direction, and seventy-eight (78) Y sensor coils arranged side by side along the Y-axis direction orthogonally intersecting the X-axis direction. The timings of oblique sensor coils (third sensor coil) that are arranged in a state rotated by a predetermined angle with respect to the X and Y sensors are also provided. The operation of the oblique sensor coils will be more fully explained below. In the first embodiment, for purposes of explanation, the description of the operation thereof is made on the assumption that there are no oblique sensor coils.

In order to detect coordinates (position) and directions, in a three-dimensional space, of the input elements 102 to 104, which are components of the motion capture input device 101, the motion capture detecting device 112 generates, in the transmitted signal generating circuit 207, signals of frequencies fu, fv, and fw, which respectively correspond to the resonant frequencies fu, fv, and fw of input elements 102 to 104. Signals are selectively switched at a predetermined time by the selector circuit 208. The selected signals are output to the signal output circuits 306–308, which respectively correspond to the above-described frequencies fu, fv, and fw, through the transmitting circuitry 209 and the signal cables ill.

As a consequence, in the input device 101, the input coils 105 to 107 are supplied with signals corresponding to the respective resonant frequencies of the respective resonant circuits of these input coils 105 to 107. During a transmission period, the signals of the respective corresponding frequencies are output from the input elements having these input elements.

When the frequency of signals is fu, the signals are output from the input element 102 having the input coil 105. When the frequency of signals is fv, the signals are output from the input element 103 having the input coil 106. When the frequency of signals is fw, the signals are output from the input element 104 having the input coil 107.

When signals are output from the input elements 102 to 104, signals occur in sensor coils 113 by electromagnetic coupling. During a reception period within the aforementioned transmission period, the X sensor coils and the Y sensor coils of sensor coils 113 are scanned at a predetermined time by the control section 210. Large detection signals are obtained from sensor coils located proximate to input device 101. Detection signals become smaller as the distance between sensor coils and input device 101 increases.

As shown in FIG. 4A, during the transmission period, a signal of the frequency fu, corresponding to the resonant frequency fu, is outputted from the transmission control section 206 to the input device 101 through the transmitting circuitry 209 and the signal cable 111. In the input device 101, the signal is then outputted from the input element 102 having the input coil 105, constituting the resonant circuit with the resonant frequency fu.

In this embodiment, the above-described transmission is performed during the entire transmission period, including the reception period. However, during the period except the reception period, the detecting device 112 does not perform a receiving operation (see a transmission/reception timing 401 in FIG. 4A). However, in this case also, as in the case of a transmission/reception timing 402, the transmission/reception may be arranged so that the transmission period and the reception period are separated. When the input device 101 is of a type such that a signal is transmitted from the sensor coil 113 to the input device 101, and that, after having been received by the input device 101, the signal is returned to and received by the sensor coil 113, the transmission/reception timing becomes like the transmission/reception timing 402.

Next, in the reception period, the signal outputted from the input element 102 by electromagnetic coupling is received by one of the X sensor coils selected by the selective control of the control section 210. After having been amplified by the receiving circuit 201, the signal received by the aforementioned sensor coil is detected by the detection section 202. The signal level thereof is thereby detected. The transmitting operation and the receiving operation are each repeated four times for every X sensor, as shown in FIG. 4B, and the detection signal levels obtained are temporarily stored in a buffer memory (not shown). Then, the total value of the detection signal levels is assumed as a detection signal level detected by the aforementioned sensor coil, and the data on the above-described detection signal level is stored in the memory 204 in association with the above-described sensor coil used for detection. In this embodiment, repeating the transmitting operation and receiving operation a plurality of times allows noises to be reduced. In this embodiment, to make the sequence of digitizing operation conform to the conventional one, the transmitting operation and receiving operation are each repeated four times for every X sensor. However, these operations are not necessarily required to repeat four times per X sensor coil. The number of repetitions may be set to various numbers in accordance with accuracy of obtained signals or the like.

With regard to the frequency fu, the above-described operation is performed with respect to all X sensor coils (i.e. one hundred and three (103) coils in this embodiment) and all Y sensor coils (seventy-eight (78) coils in this embodiment), as shown in FIG. 4C.

Then, operations similar to the above-described operation are performed with respect to signals of the frequencies fv and fw. In the input device 101, a signal of the frequency fv is outputted from the input element 103 having the input coil 106, and a signal of the frequency fw is outputted from the input element 104 having the input coil 107.

By performing the operations with respect to the frequencies fu, fv, and fw, one cycle of operation is completed, as shown in FIG. 4D.

This embodiment is arranged so that the transmission of signals from input device 101 is performed over the entire transmission period, and that the reception thereof is performed by detecting device 112 during the reception period within the above-described transmission period. Alternatively, this embodiment may be arranged so that the input device 101 has a resonance circuit and that, after the signal transmission from the detecting device 112 has been completed, the signal returned by the input device 101 is received by the detecting device 112, whereby the transmitting operation and the receiving operation by the detecting device 112 are alternately performed.

Still alternatively, this embodiment may be arranged so that signals are transmitted from the detection device 112 (sensor coil 113), and the signals are received by the input device 101, whereby coordinates and directions of the input device 101 in a three-dimensional space are obtained. In this case also, the arrangement may be such that the transmission of signals from the detection device 112 is performed over the entire transmission period, and that the signals are received by the input device 101 during the reception period within the above-described transmission period. Yet alternatively, this embodiment may be arranged so that, after the detecting device 112 has completed the transmission of signals, the signals from the detecting device 112 are received by the input device 101, whereby the transmission operation of the detecting device 112 and the reception operation of the input device 101 are alternately performed.

Figure 5:
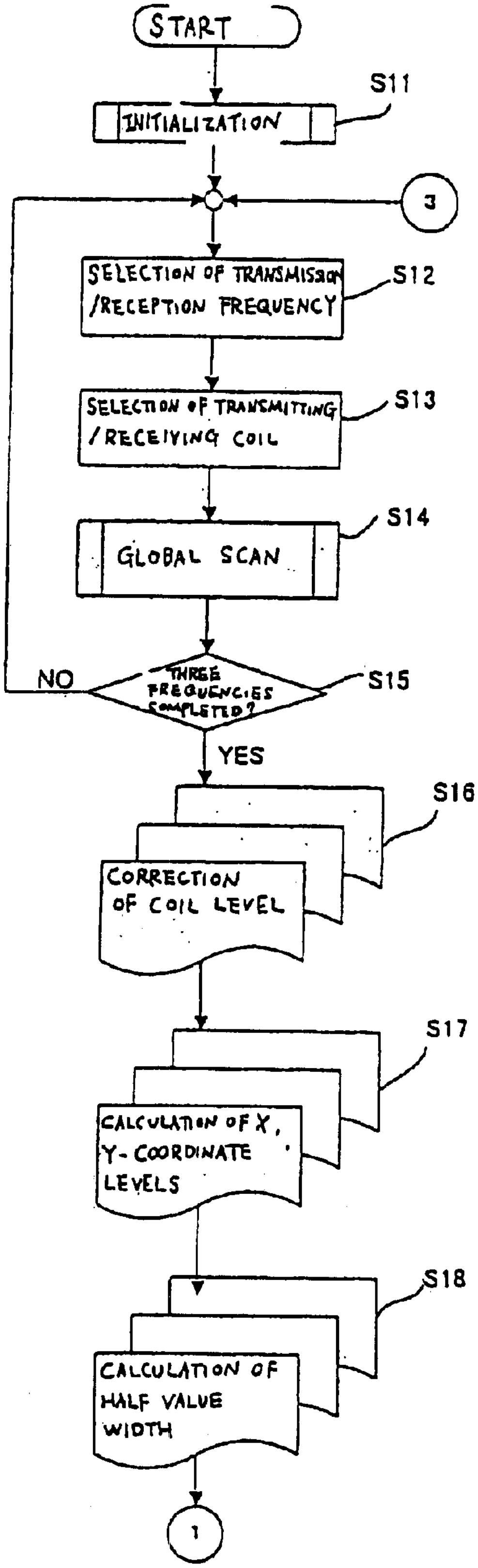
FIG. 5 is a flowchart showing process steps for the motion capture system according to the first embodiment.
Figure 6:
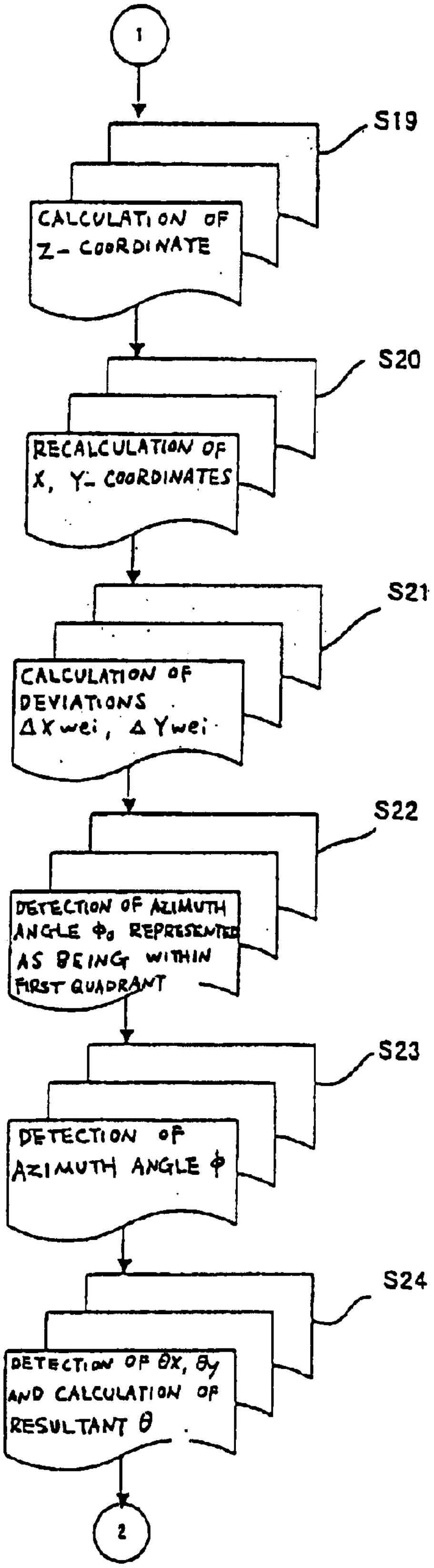
FIG. 6 is another flowchart showing process steps for the motion capture system according to the first embodiment.
Figure 7:
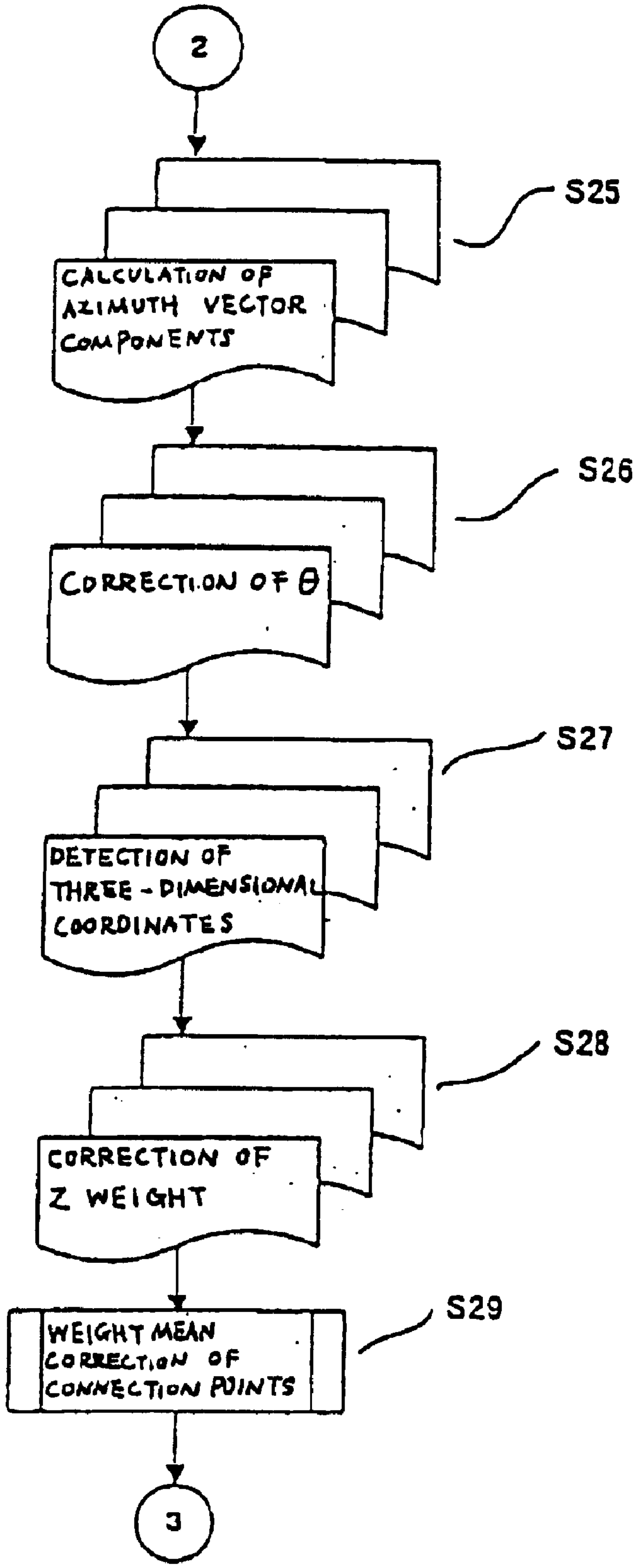
FIG. 7 is still another flowchart showing process steps for the motion capture system according to the first embodiment.

FIGS. 5 to 7 are flowcharts showing process steps for the motion capture system according to the first embodiment.

Figure 8:
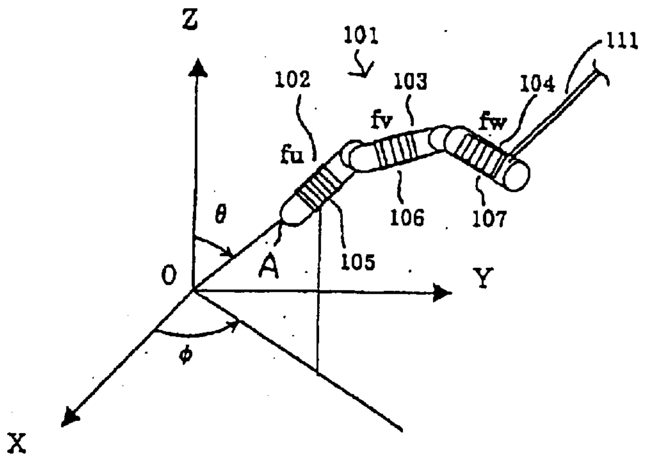
FIG. 8 is a schematic view explaining detection processing of the motion capture input device according to the first embodiment.

FIG. 8 is a schematic view explaining the operation of the first embodiment, in which X, Y, Z-coordinates and directions (a tilt angle θ from the vertical line, and an azimuth angle ϕ relative to the X-axis) of the input device 101 are illustrated.

Hereinafter, the operations of the first embodiment will be described in detail with reference to FIGS. 1 to 8.

First, initialization processing is performed in step S11 in FIG. 5 with respect to the memory 204 of the control section 210, and the buffer memories provided in the CPU 205, the transmission control section 206, the control section 210, and the detecting section 202.

Next, as described above with reference to FIGS. 4A to 4D, signals of mutually differing frequencies are sequentially transmitted from the input device 101 to the detection device 112 at a predetermined time. The signals from the input device 101 are received and detected by the detection device 112 by electromagnetic coupling.

Specifically, by switching the selector 208 of the transmission control section 206, the frequency of a signal to be transmitted to the input device 101 is selected in step S12. As shown in FIG. 4D, because the selection of frequency is repeatedly performed in the order of frequencies fu, fv, and fw at a predetermined time, the connection of the selector 208 is first selected so as to output the signal of the frequency fu.

Next, the sensor coil 113 to receive the signal from the input device 101 by electromagnetic coupling is selected by switching in step S13.

In this situation, the signal of the frequency fu is outputted from the transmission control section 206 to the input device 101. After having been received by the above-described selected sensor coil 113, the signal is subjected to a level detection in the detecting section 202. By sequentially selecting all X sensor coils and all Y sensor coils of the sensor coils 113 at a predetermined time, the above-described detecting operation (or "global scan") is performed in step S14.

It is determined whether the above-described operations have been performed with respect to signals of the three kinds of frequencies fu, fv, and fw in step S15. If it is determined that the operations have not been performed with respect to all signals of the frequencies fu, fv, and fw, the processing returns to step S12. In step S15, if it is determined that the operations have been performed with respect to all signals of the frequencies fu, fv, and fw, that is, if it is determined that the processing for detecting signals from all input elements 102 to 104 has been completed, the processing proceeds to step S16.

According to the above-described processing, the detection levels of the signals received from the input device 101, and data on the sensor coils corresponding to these detection levels are stored in the memory 204 for each of the frequencies fu, fv, and fw. In other words, the detection levels of the signals received from the input elements 102 to 104, and data on the sensor coils corresponding to these detection levels are stored in the memory 204.

In step S16, making reference to a table related to the reception level that is stored in the memory 204 in advance, variations in the sensitivity of the reception levels of sensor coils 113 in steps S12 to S15 are corrected with respect to the reception levels of sensor coils 113. This level correction is performed with respect to each of the input elements 102 to 104, namely, with respect of all signals of the frequencies fu, fv, and fw. Also, in step S16, the peak value of the signal level detected by the Y sensor coils is corrected for each of the input elements so as to conform to the signal level detected by the X sensor coils.

FIGS. 9 to 12 are characteristic views explaining the level correction in step S16, which show correction data in level correcting tables stored in the memory 204 in advance. FIG. 13 is a representation of detection signals LUx from the input element 102, the detection signals having been detected by the X sensor coils. Here, LUxm denotes the peak value of a main signal, Xm denotes an X-axis coordinate when the peak value LUxm is obtained, LUxs1 denotes the peal value of a left sub-signal, Xs1 denotes an X-axis coordinate when the signal LUxs1 is obtained, LUxs2 denotes the peal value of a right sub-signal, Xs2 denotes an X-axis coordinate when the signal LUxs2 is obtained, and XG denotes the X-axis coordinate of the barycentric position of the input coil 105.

Signals detected by the Y sensor coils can also be represented in the same manner. Hereinafter, the signal detected by the Y sensor coil is represented by a symbol Y instead of the symbol X. Also, detection signals from the input elements 103 and 104 can be represented in the same manner as those from the input element 102, which are illustrated in FIG. 13.

Figure 9:
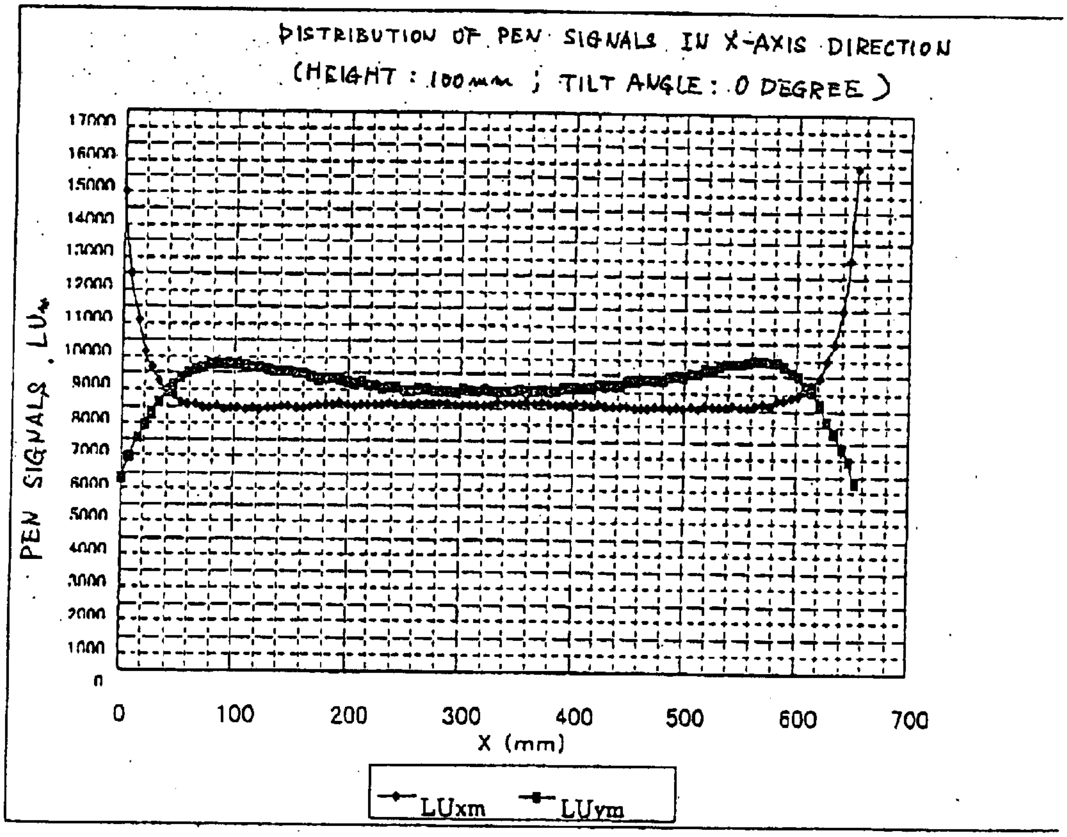
FIG. 9 is a characteristic view showing the distribution of pen signals in the X-axis direction.

As shown in FIG. 9, main signals LUxm and LUym of the signal levels respectively detected by each of the X sensor coils and each of the Y sensor coils are plotted while moving the input device 101 from the X sensor coil at one end to the X sensor coil at the other end along the X-axis direction, in a state in which the front end portion A (see FIG. 8) of the input device 101 is spaced from the above-described detection surface by a predetermined distance, and in which the input device 101 is kept vertical (i.e., tilt angle θ=0 degree). In the first embodiment, this is a position 100 mm above the detection surface. Here, the "pen signal" represented by the vertical axis in FIG. 9 means a signal level obtained by detecting, using each of sensor coils 113, a signal outputted from the pen coil 105.

Figure 10:
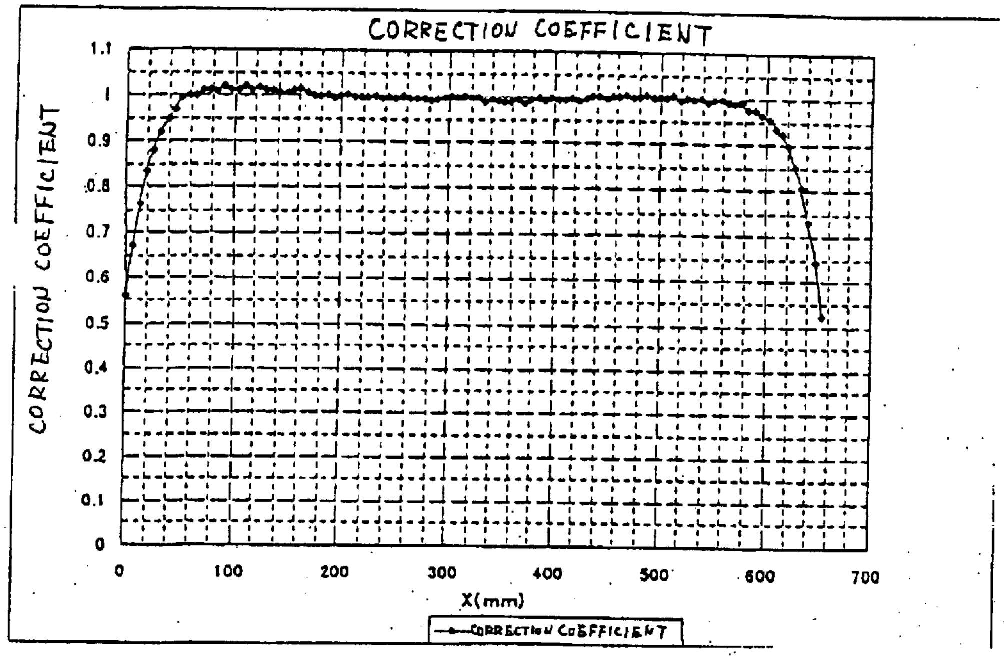
FIG. 10 is graph of X-axis direction correction coefficients in the first embodiment.

FIG. 10 is a table showing correction coefficients (X-axis direction correction coefficients) by which the main signals LUxm and LUym detected as described above are multiplied, in order to make each of the main signals LUxm and LUym conform to the level of the main signal in the vicinity of an origin (i.e. the central part of the detection surface) for flattening the detection levels. The X-axis direction correction coefficients shown in FIG. 10 are stored in the memory 204 in advance as a correction coefficient table.

Figure 11:
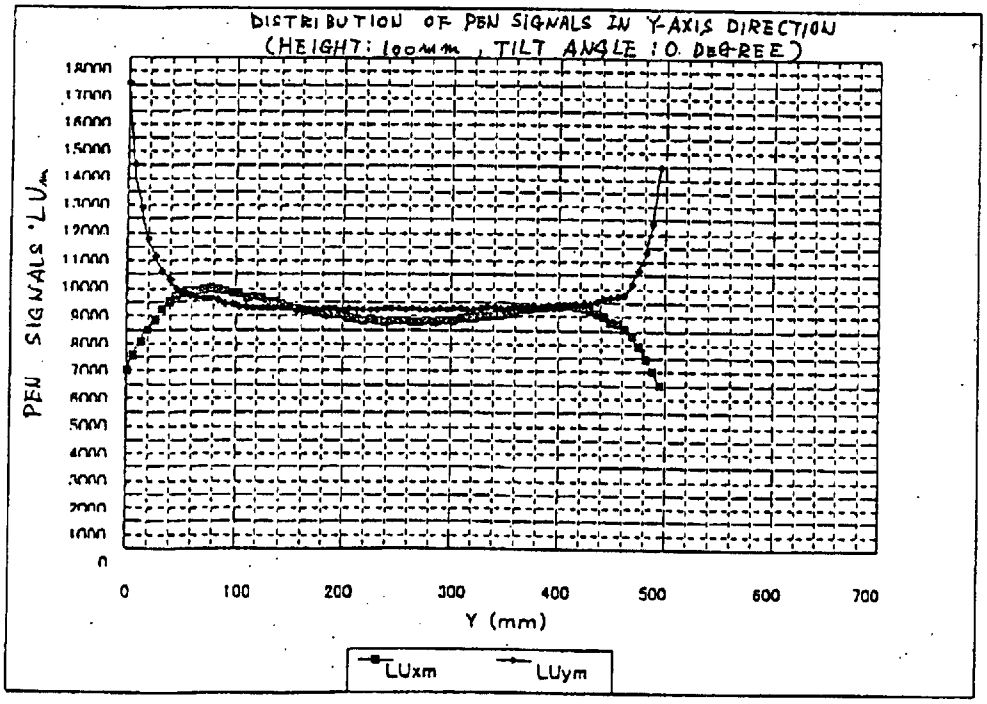
FIG. 11 is a characteristic view showing the distribution of pen signals in the Y-axis direction.

As shown in FIG. 11, main signals LUxm and LUym of the signal levels respectively detected by each of the X sensor coils and each of the Y sensor coils are plotted while moving input device 101 from the Y sensor coil at one end to the Y sensor coil at the other end along the Y-axis direction, in a state in which the front end portion of the input device 101 is spaced from the detection surface by a predetermined distance, and in which the input device 101 is kept vertical (i.e., tilt angle θ=0 degree). In this embodiment, this is a position 100 mm above the detection surface.

Figure 12:
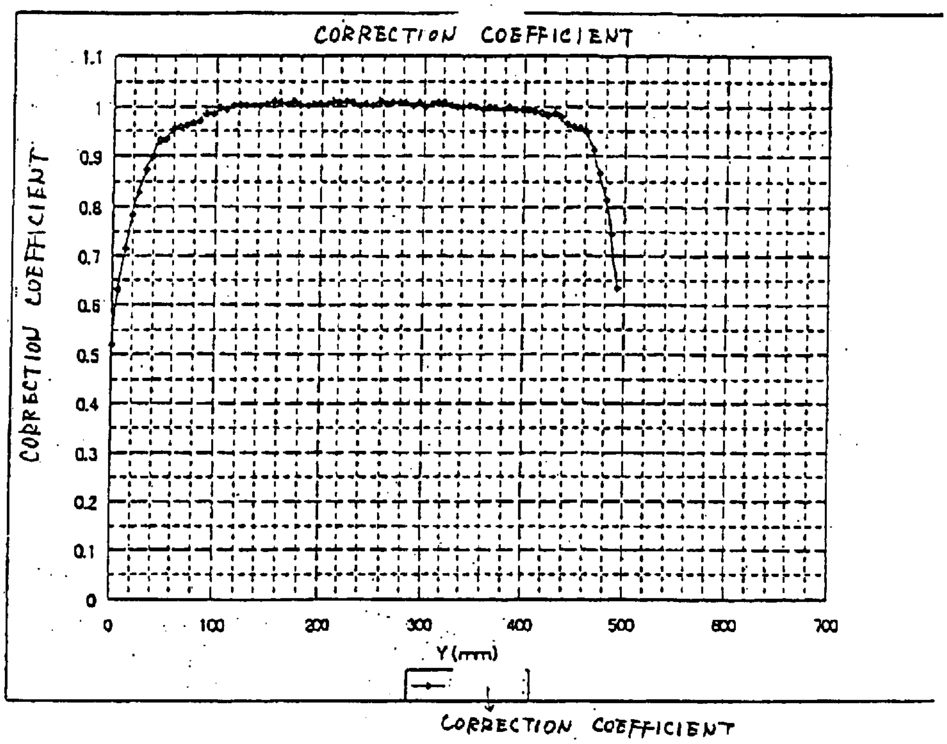
FIG. 12 is a graph of Y-axis direction correction coefficients in the first embodiment.
Figure 13:
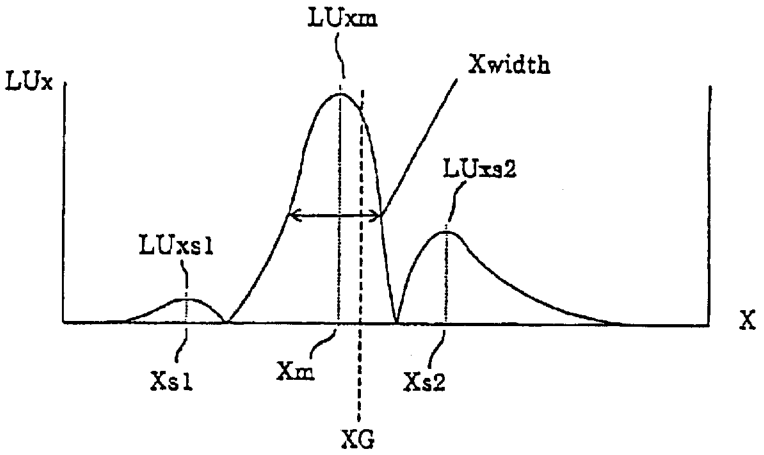
FIG. 13 is a representation of detection signals detected by X sensor coils and transmitted from an input element in the first embodiment.

FIG. 12 is a table showing correction coefficients (Y-axis direction correction coefficients) by which the peak signals LUxm and LUym detected as described above are multiplied, in order to make the peak signals LUxm and LUym conform to the levels of peak signals in the vicinity of the origin (the central part of the detection surface) for flattening the detection levels. The Y-axis direction correction coefficients shown in FIG. 12 are stored in the memory 204 in advance as a correction coefficient table.

In step S16, with regard to the frequencies fu, fv, and fw (i.e., with regard to the input coils 105 to 107), making reference to the above-described correction coefficient tables (see FIGS. 10 and 12), variations of the reception levels of the sensor coils 113 are corrected, and the peak values of the signal levels detected by the Y sensor coils are corrected for each of the input elements 102 to 104 so as to conform to those of the signal level detected by the X sensor coils.

By the above-described correction processing, variations in the sensitivity among all sensor coils constituting the sensor coils 113 are corrected, whereby correct detection processing can be performed in subsequent detection processing.

Next, in step S17, by a well-known method using parabolic approximation, the CPU 205 calculates the X-coordinate Xm of the maximum signal level point, and the level at this X-coordinate point as the maximum signal level LUxm, and then calculates the Y-coordinate Ym of the maximum signal level point in the Y-axis direction, and the level of this Y-coordinate point as the maximum signal level LUym, based on the maximum detection signal level in detection signals (pen signals fu) that are detected after having been received from the input coil 105, and the detection signal levels at two side points in the vicinity of the aforementioned maximum detection signal level points. The processing of step S17 is executed with respect to all input elements 102 to 104.

Then, in step S18, the CPU 205 calculates the X-axis direction half value width Xwidth at the maximum signal level of the pen signal fu (or the Y-axis direction half value width Ywidth). The processing of step 8 is executed with respect to all input elements 102 to 104.

Figure 14:
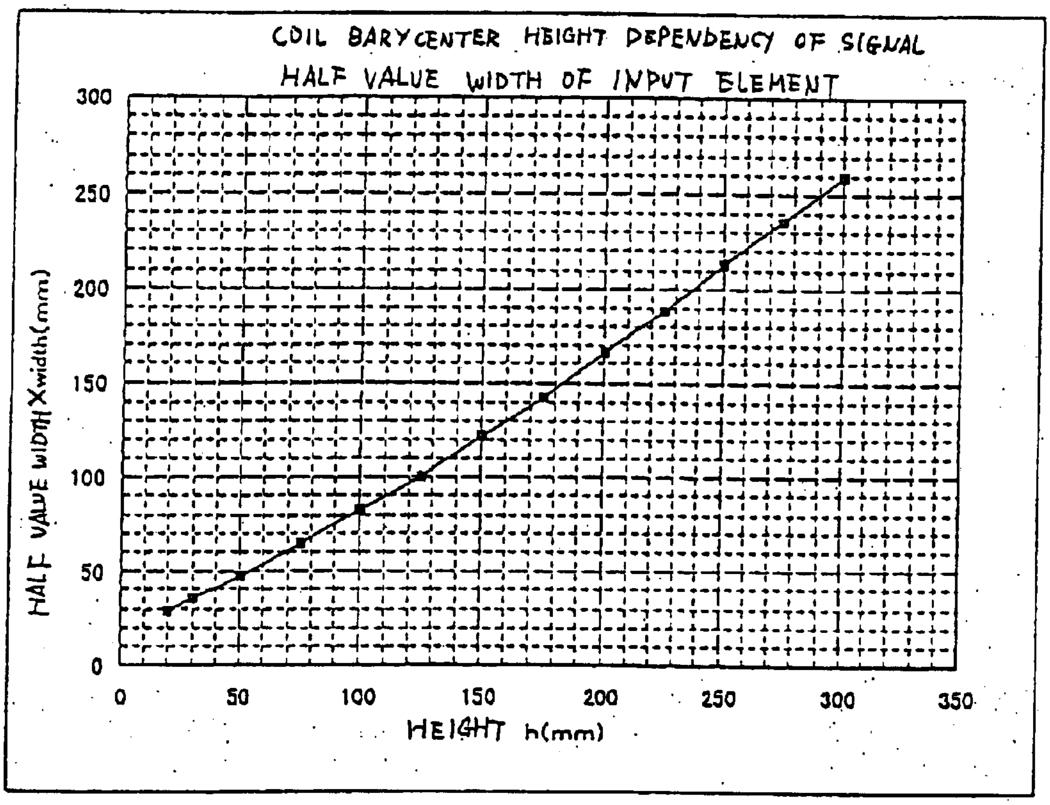
FIG. 14 is a table showing the relationship between the half value width and the height of the input element in the first embodiment.

Thereafter, in step S19, the CPU 205 calculates the height (Z-axis coordinate) corresponding to the aforementioned half value width, making reference to a height table shown in FIG. 14. FIG. 14 is a height table showing the relationship between the height of the input element and the above-described half value width Xwidth. This table is stored in the memory 204 in advance. With regard to the Y-axis component also, a height table showing the relationship between the height of the input element and the half value width Ywidth is stored in the memory 204 in advance, as in the case of the X-axis component shown in FIG. 14. Meanwhile, in this embodiment, a half value width is used in calculating the height, but the half value width is not always needed. Any predetermined width in the vicinity of the half value width may be used instead of the half value width.

The half value width Xwidth or Ywidth is calculated based on the signal having the higher level out of detection signals of X-axis component and Y-axis component, and the height (Z-axis coordinate) of the input element is calculated based on the calculated half value width Xwidth or Ywidth, making reference to the above-described height table. Since the signal having the higher level provides more correct detection data, the use of the signal having the higher level to determine the height improves the detection accuracy of height. The processing of step 19 is executed with respect to all input elements 102 to 104.

Next, in step 20, the CPU 205 recalculates the peak value of the main signal of a detection signal and the X-coordinate and the Y-coordinate of the aforementioned peak value, and calculates the barycentric coordinates of the input element 102. The CPU together detects the X-axis and Y-axis coordinates (Xm and Ym) of the peak value, the main signal of signals received by the X sensor coils (i.e., the X-axis main signal LUxm), the main signal of signals received by the Y sensor coils (i.e., the Y-axis main signal LUym), the X-coordinate Xs1 of the peak value of a left sub-signal on the X-axis, the Y-coordinate Ys1 of the peak value of a sub-signal signal on the Y-axis, the peak signal value LUxs1 of the aforementioned X-axis left sub-signal, the peak signal value LUys1 of the aforementioned Y-axis left sub-signal, the X-coordinate Xs2 of the peak value of a right sub-signal on the X-axis, the Y-coordinate Ys2 of the peak value of a right sub-signal on the Y-axis, the peak signal value LUx2 of a right sub-signal on the X-axis, and the peak signal value LUy2 of a right sub-signal on the Y-axis. The CPU 205 then calculates the barycentric coordinates of the input coil 105, that is, the barycentric coordinates (XG, YG) of the input element 102 using the following expressions in step S20.

$$XG=(LUxs1*Xs1+LUxm*Xm+LUxs2*Xs2)/(LUxs1+LUxm+LUxs2)$$

$$YG=(LUys1*Ys1+LUym*Ym+LUys2*Ys2)/(LUys1+LUym+LUys2)$$

Here, the barycentric coordinate ZG of the input element 102 in the height direction (Z-axis direction) is given by ZG=Z.

The processing of step 20 is executed with respect to all input elements 102 to 104. Thus, the coordinates of each of the input elements in a three-dimensional space are obtained up to a point.

Then, based on the deviations from the obtained barycentric coordinates: ΔX=(Xm−XG) and ΔY=(Ym−YG); and the X-axis main signal LUxm and the Y-axis main signal LUym, weighted deviations ΔXwei and ΔYwei are determined using the following expressions in step S21.

$$\Delta X\text{wei}=\Delta X*LUxm/\sqrt{(LUxm^2+LUym^2)}$$

$$\Delta Y\text{wei}=\Delta Y*LUym/\sqrt{(LUxm^2+LUym^2)}$$

As the deviations ΔX and ΔY increase in the direction in which each of the input elements 102 to 104 is tilted, the ratio of the peak values of a detection signal increases. That is, the values themselves of the deviations ΔX and ΔY are subjected to variations by the magnitude of the tilt angle θ, and therefore, in order to determine the correct tilt angle θ, the tilt angle θ is determined using the weighted deviations ΔXwei and ΔYwei instead of the deviations ΔX and ΔY.

$$\theta=Ct*\sqrt{(\Delta X\text{wei}^2+\Delta Y\text{wei}^2)}$$

Here, Ct is a predetermined proportional constant.

The processing of step 21 is executed with respect to all input elements 102 to 104.

Next, in step S22, a temporary azimuth angle $\phi_0$ by which the azimuth angle ϕ is temporarily represented as being within the first quadrant, is calculated using the following expression.

$$\phi_0=\text{Tan}^{-1}(\text{ABS}(\Delta Y\text{wei}/\Delta X\text{wei}))*180/\pi(\text{degrees})$$

Here, ABS (ΔYwei/ΔXwei) denotes the absolute value of (ΔYwei/ΔXwei).

The processing of step 22 is executed with respect to all input elements 102 to 104.

Here, when the detection of the polarity of detection signals is also possible (for example, when signals communicated between the input device 101 and the detecting device 112 are synchronized with the detection timing in the detecting section 202), a general azimuth angle φ is calculated in step S23 as shown below.

Figure 15:
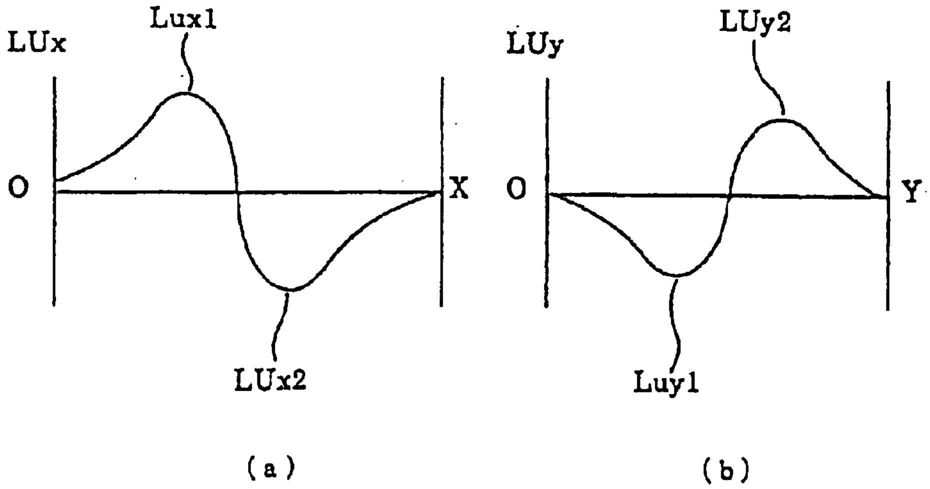
FIG. 15 is a representation of signals detected by sensor coils in the first embodiment.
Figures 16, 17:
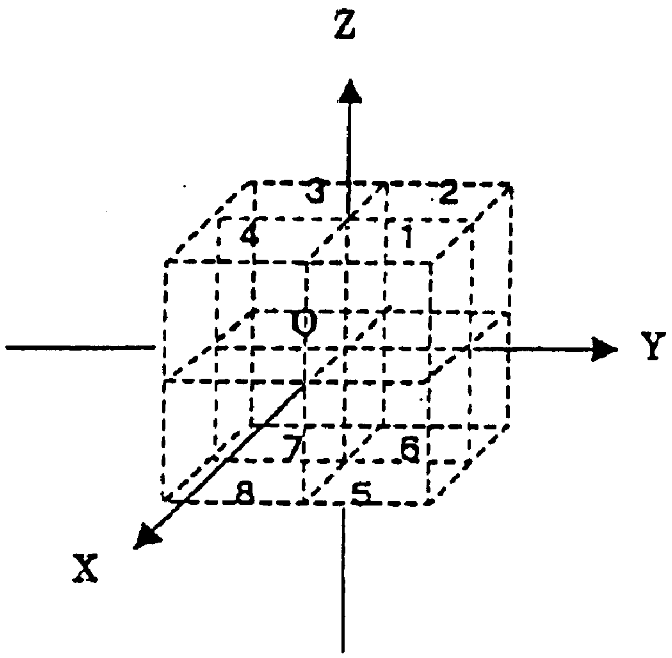
FIG. 16 is a representation defining quadrants in a three-dimensional space, in the first embodiment.
FIG. 17 is a quadrant table used in the first embodiment.

FIG. 15 is a representation of signals detected by sensor coils. FIGS. 15A and 15B shows detection signals of X-coordinate component and Y-coordinate component, respectively. The polarities of the detection signals have been detected together with the levels thereof, and positive detection signals and negative signals have been obtained. FIG. 16 is a representation defining the quadrants in a three-dimensional space. Numbers in the drawing represent quadrants. FIG. 17 is a quadrant table showing the relationship between the quadrants defined by FIG. 16 and the sign of the detection signal. This quadrant table is stored in the memory 204 in advance.

Here, when the detection of the polarity of detection signals is also possible (when the detection of the positive and negative polarity of detection signals as well as the level thereof are possible), two signal values of each of the X component signal and the Y component signal: LUx1 and LUx2; and LUy1 and LUy2, are selected each of which has a larger absolute value, be it a peak value or a valley value. From the signs of these signal values LUx1, LUy1, and (LUx1+LUx2), a quadrant is determined, and thereby the general azimuth angle φ is determined.

By determining a quadrant, which is variable from the first to eighth quadrants, based on the signs of the detection signals and the magnitude relation between the signal values (see FIGS. 15 to 17), a mirror image disappears and a real image (azimuth angle φ in the correct direction) can be obtained.

On the other hand, when the detection of the polarity of detection signals is impossible, the quadrant is determined from the signs of the deviations ΔX and ΔY, and the general azimuth angle φ, which is variable from 0 to 360 degrees, is determined. Here, the azimuth angle φ falls within the first quadrant when both ΔX and ΔY are negative, falls within the second quadrant when ΔX is positive and ΔY is negative, falls within the third quadrant when both ΔX and ΔY are positive, and falls within the forth quadrant when ΔX is negative and ΔY is positive.

The above-described processing is executed with respect to all input elements 102 to 104. Thereby, the azimuth angle φ of each of the input elements 102 to 104 is determined.

Next, when the detection of the polarity of detection signals is impossible (when only the detection of the level of detection signals is possible, but the detection of the positive and negative polarity thereof is impossible), the X-axis direction tilt angle θx (the X-axis component of the tilt angle θ) of the input element 102, and the Y-axis direction tilt angle θy (the Y-axis component of the tilt angle θ) thereof are determined from the ratio between left and right sub-signals by the following expressions, and then the tilt angle θ is calculated, in step S24.

$$\theta x = ABS((LUxs1 - LUxs2)/(LUxm - LUxs\min))*90(\text{degrees})$$

$$\theta y = ABS((LUys1 - LUys2)/(LUym - LUys\min))*90(\text{degrees})$$

Here, a symbol "ABS" denotes an absolute value, LUxsmin denotes the lower peak value of the sub-signals of signals received by the X sensor coils, and LUysmin denotes the lower peak value of the sub-signals of signals received by the Y sensor coils.

Here, out of the X-axis and the Y-axis, the axis having a direction nearer to the direction in which each of the input elements 102 to 104 is tilted, has a larger tilt, and therefore, as a resultant tilt angle θ, the larger one of θx and θy is adopted. That is, $$\theta = MAX(\theta x, \theta y)$$

Here, "MAX" is a symbol denoting that a larger numeral value is to be adopted.

The processing of step 24 is executed with respect to all input elements 102 to 104. Thereby, the tilt angle θ of each of the input elements 102 to 104 is determined.

Next, in step S25, the direction vector component Ux in the X-axis direction, the direction vector component Uy in the Y-axis direction, and the direction vector component Uz in the Z-axis direction are determined by the following expressions.

$$Ux = \sin\theta\cos\phi,\ Uy = \sin\theta\sin\phi,\ Uz = \cos\theta$$

The processing of step 25 is executed with respect to all input elements 102 to 104.

However, in oblique directions such as φ=45 degrees, θ=45 degrees and the like, the resultant tilt angle θ is estimated to be a little low as compared with the real resultant tilt angle θ. The tilt angle θ, therefore, is corrected using the tilt angle θ obtained by the following expression in step S26. The expression below is one established based on experiments.

$$\theta = \theta + ABS(Ux*Uy*Uz)*60(\text{degrees})$$

Here, ABS is a symbol denoting an absolute value.

Using the tilt angle θ obtained in this manner, the direction vector components (Ux, Uy and Uz) of the input element 102 are redetermined, and the redetermined results are treated as the ultimate direction vectors. This processing is also executed with respect to all input elements 102 to 104. Thereby, the unit vectors in the X, Y, and Z-axis directions of each of the input elements 102 to 104 are determined.

Then, the height Z is corrected by the tilt angle θ. For example, when the input element is tilted in the direction of azimuth angle φ=0 degree at a predetermined height, e.g., at a height of 100 mm, the half value width Xwith of the X-axis signal increases with an increase in the tilt angle θ.

The half value width ratio obtained by dividing the aforementioned half value width Xwith of the X-axis signal by the half value width Xwidth at a tilt angle θ=0 degree, is 1.0 at a tilt angle θ=0 degree. The half value width ratio simply increases with an increase in the tilt angle θ, and becomes 1.13 at a tilt angle θ=90 degrees. By using this relationship, the half value width Xwidth at any tilt angle θ is corrected. In this way, the half value width Xwidth at a tilt angle θ=0 degree is estimated.

The height Z is corrected by substituting the above described corrected half value width Xwidth into expressions for determining the height Z.

Next, three-dimensional coordinates (XG, YG, ZG) of the barycentric position of the input element 102 are calculated.

In this case, as the value of ZG, the value of the height Z is used. By the method using three points, that is, the peak value of a detection signal plus the left and right sub-signals with respect to the aforementioned peak value, each of the coordinates X and Y and the signal value are detected. As shown in FIG. 13, the peak signal coordinates Xm and Ym, the peal signal values LUxm and LUym, the coordinates Xs1, Xs2, Ys1, and Ys2 of left and right side lobes, and the sub-signal values LUxs1, LUxs2, LUys1, and LUys2 are together detected, and then the coordinates (XG, YG, ZG) of the input element 102 are calculated using the following expressions. Here, the use of weighted means as in the following expressions reduces detection error due to the height and/or the directions of the input element.

$$XG=(LUxs1*Xs1+LUxm*Xm+LUxs2*Xs2)/(LUxs1+LUxm+LUxs2)$$

$$YG=(LUys1*Ys1+LUym*Ym+LUys2*Ys2)/(LUys1+LUym+LUys2)$$

$$ZG=Z$$

The same processing is executed with respect to the input elements 103 and 104. Thereby, the direction vector components (Vx, Vy, Vz) and (Wx, Wy, Wz), respectively, of the input elements 103 and 104 are calculated, and the three-dimensional coordinates (Xv, Yv, Zv) and (Xw, Yw, Zw), respectively, of the barycentric positions of the input elements 103 and 104 are calculated in step S27.

The above-described processing provides more correct coordinates of the input element 102 in a three-dimensional space.

Next, descriptions are made of a method for determining the tilt angle θ and the azimuth angle ϕ when both of the X sensor and the Y sensor can also detect negative signals (when the detection of the positive and negative polarity of detection signals as well as the level thereof are possible).

When both of the X sensor and the Y sensor can also detect negative signals, negative signals are also detected, and signals that exist on the left and right sides of a detection signal (main signal) that has the maximum absolute value irrespective whether the polarities thereof is positive or negative, are selected as sub-signals. Thereafter, from signals detected by the X sensor coils, the maximum value LUxm, the medium value LUxmed, and the minimum value LUxmin are calculated. Likewise, from the signals detected by the Y sensor coils, the maximum value LUym, the medium value LUymed, and the minimum value LUymin are calculated.

Then, the X-axis signal ratio ratio__x is expressed by the following equation.

$$ratio\_x=(LUxmed-LUxmin)/(LUxm-LUxmin)$$

Figure 18:
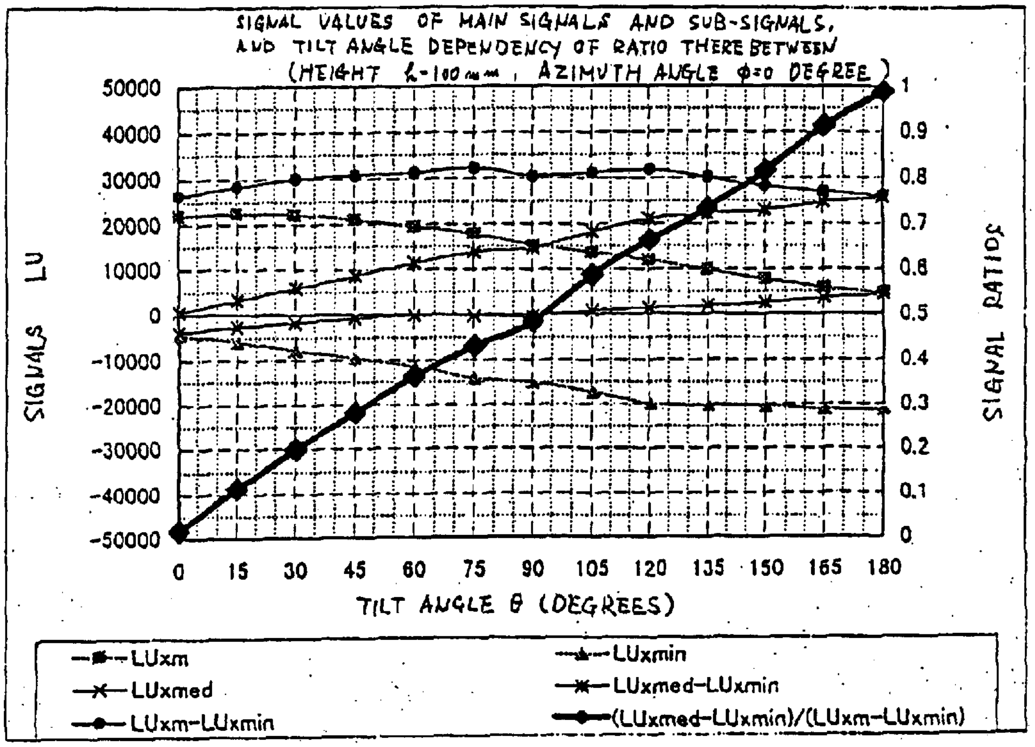
FIG. 18 is a table showing the tilt angle dependency in the first embodiment.

As shown in FIG. 18, this X-axis signal ratio ratio__x increases from 0 to 1 substantially in proportion with the tilt in the X-axis direction, so that the tilt angle θx in the X-axis direction can be detected making reference to the tilt angle dependency table in FIG. 18. Here, FIG. 18 is a tilt angle dependency table showing the tilt angle dependency of the ratio of sub-signals on a main signal. This tilt angle dependency is stored in the memory 204 in advance.

Likewise, the Y-axis signal ratio ratio__y is expressed by the following equation.

$$ratio\_y=(LUymed-LUymin)/(LUym-LUymin)$$

This Y-axis signal ratio increases from 0 to 1 substantially in proportion with the tilt angle θy in the Y-axis direction, so that the tilt angle θy in the Y-axis direction can be detected making reference to the tilt angle dependency table stored in the memory 204 in advance. This tilt angle dependency table related to the Y-axis has a similar characteristic to that related to the X-axis shown in FIG. 18.

Figure 19:
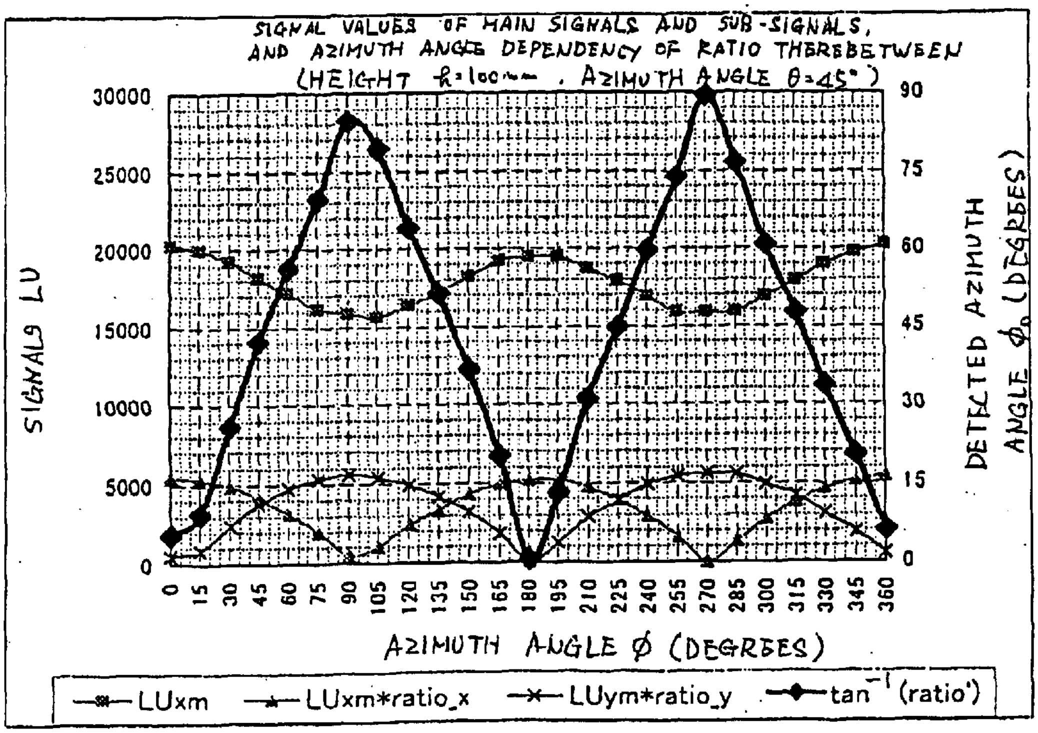
FIG. 19 is a table showing the azimuth angle dependency in the first embodiment.

As shown in FIG. 19, because each of the X-axis signal ratio ratio__x and the Y-axis signal ratio ratio__y varies depending on the azimuth angle ϕ, both tilt angles θx and θy vary depending on the azimuth angle ϕ. However, out of the X-axis and the Y-axis, the axis having a direction nearer to the direction in which each of the input elements 102 to 104 is tilted, has a larger tilt, and therefore, as a resultant tilt angle θ, the larger one of θx and θy is adopted to secure stability.

That is, $$\theta=MAX(\theta x,\ \theta y)$$

Figure 20:
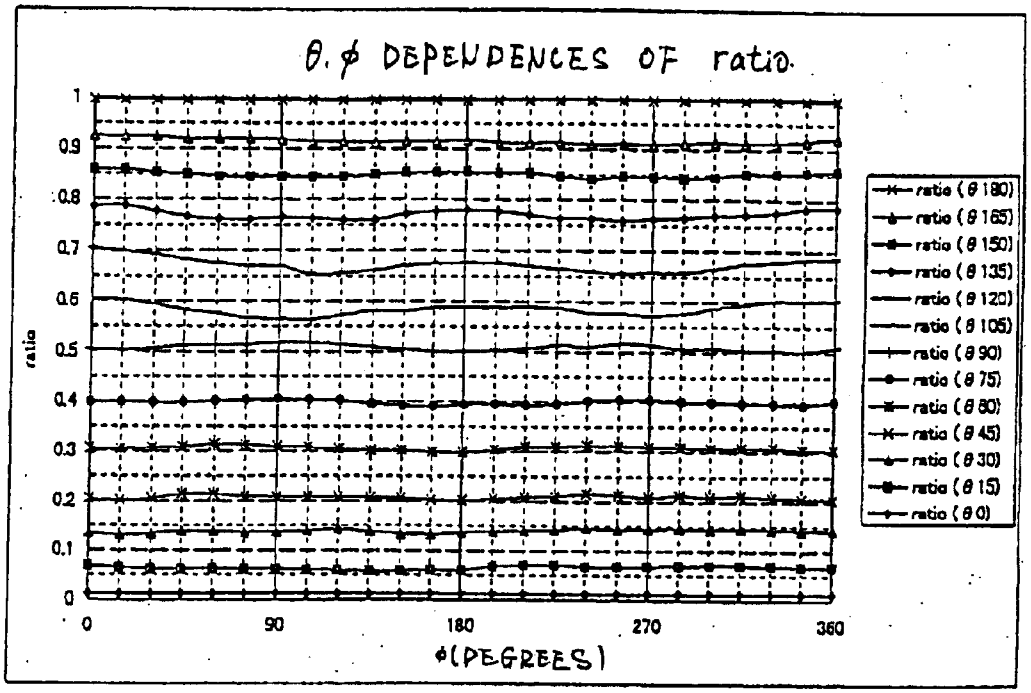
FIG. 20 is a table showing the tilt angle and azimuth angle dependencies of the signal ratio in the first embodiment.

In the above-described calculating method for the tilt angle θ, the use of the weighted mean of the signal ratios ratio__x and ratio__y employing the following expressions provides the tilt angle θ. As shown in FIG. 20, because the resultant signal ration "ratio" substantially does not depend on the azimuth angle ϕ, there is almost no azimuth angle ϕ dependency of the tilt angle θ.

$$ratio=\sqrt{(((LUxm*ratio\_x)^2+(LUym*ratio\_y)^2)/(LUxm^2+LUym^2))}$$

Here, 0≦θ≦90 degrees.

$$ratio=1-\sqrt{(((LUxm*(1-ratio\_x))^2+(LUym*(1-ratio\_y))^2)/(LUxm^2+LUym^2))}$$

Here, 90≦θ≦180 degrees.

Figure 21:
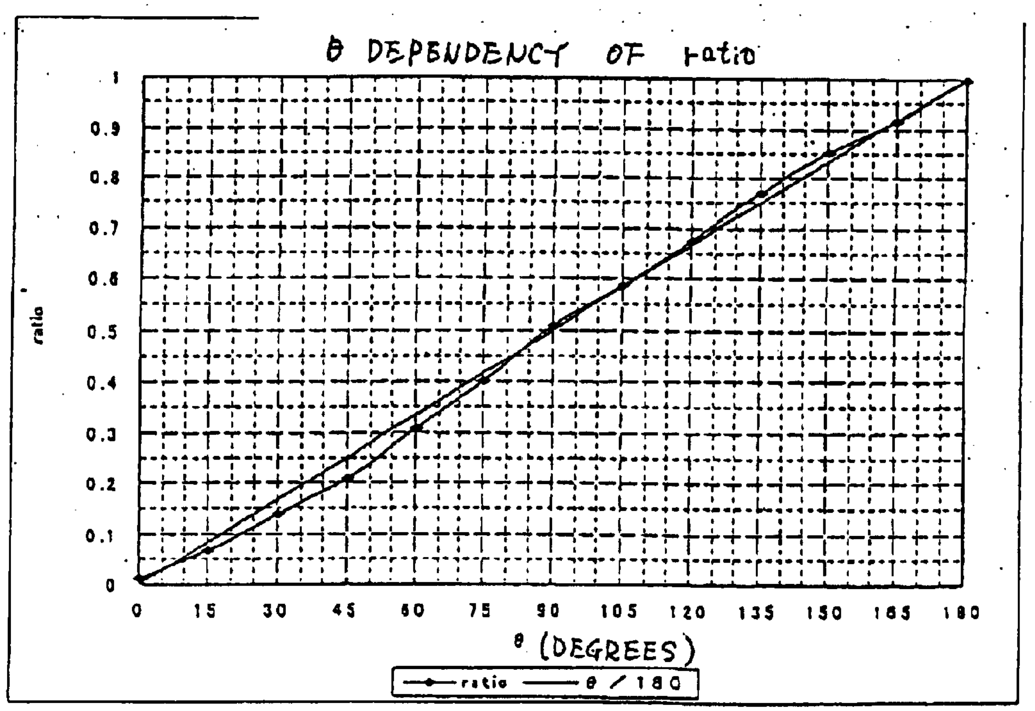
FIG. 21 is a table showing the azimuth angle dependency of the signal ratio in the first embodiment.

Because the "ratio" has an nearly linear increasing characteristic with respect to the tilt angle θ, and changes from 0 to 1, the tilt angle θ can be calculated based on the resultant signal ratio "ratio", making reference to an azimuth angle dependency table shown in FIG. 21.

Figure 22:
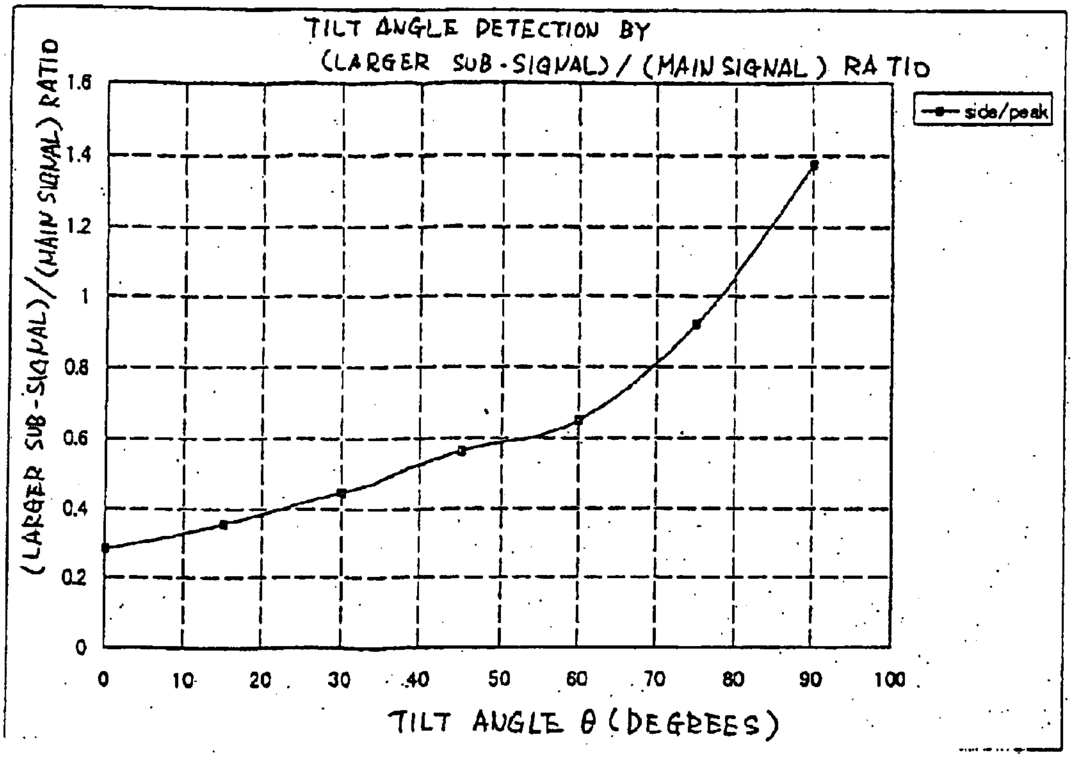
FIG. 22 is a table showing the relationship between the (larger sub-signal)/(main signal) ratio and the tilt angle in the first embodiment.

When the position of the input device 101 is so high that only a single sub-signal can be detected, the tilt angle θ is calculated from the ratio of one sub-signal having a higher peal value to the peak value of a main signal, making reference to a (sub-signal)/(main signal) ratio–tilt angle table shown in FIG. 22. Similarly, the azimuth angle ϕ is calculated from the ratio of one sub-signal having a higher peak value to the peak value of a main signal, making reference to a (sub-signal)/(main signal) ratio–tilt angle table as in FIG. 22. The X-coordinates and the Y-coordinates are corrected by the tilt angle θ and the azimuth angle ϕ.

Also, when the position of the input device 101 is further high with respect to the detecting device 111 so that a sub-signal can not be detected at all, the tilt angle θ and the azimuth angle ϕ are detected from the ratio between the left and right side half value widths at a predetermined level in a main signal of the input coil 105, for example, from the ratio of left and right side half value widths of a main signal, or the ratio of 25% value widths. Thereby, the X-coordinates and the Y-coordinates are corrected by the tilt angle θ and the azimuth angle ϕ. This provides more correct tilt angle θ and azimuth angle ϕ.

Figure 23:
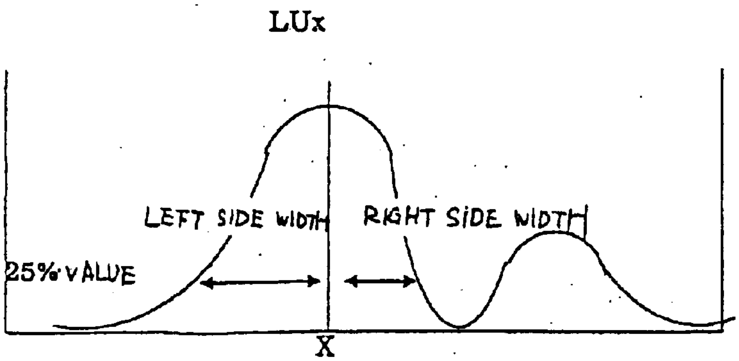
FIG. 23 is a representation explaining processing for calculating the tilt angle and azimuth angle from the ratio of 25% value width in the main signal of detection signals, in the first embodiment.
Figure 24:
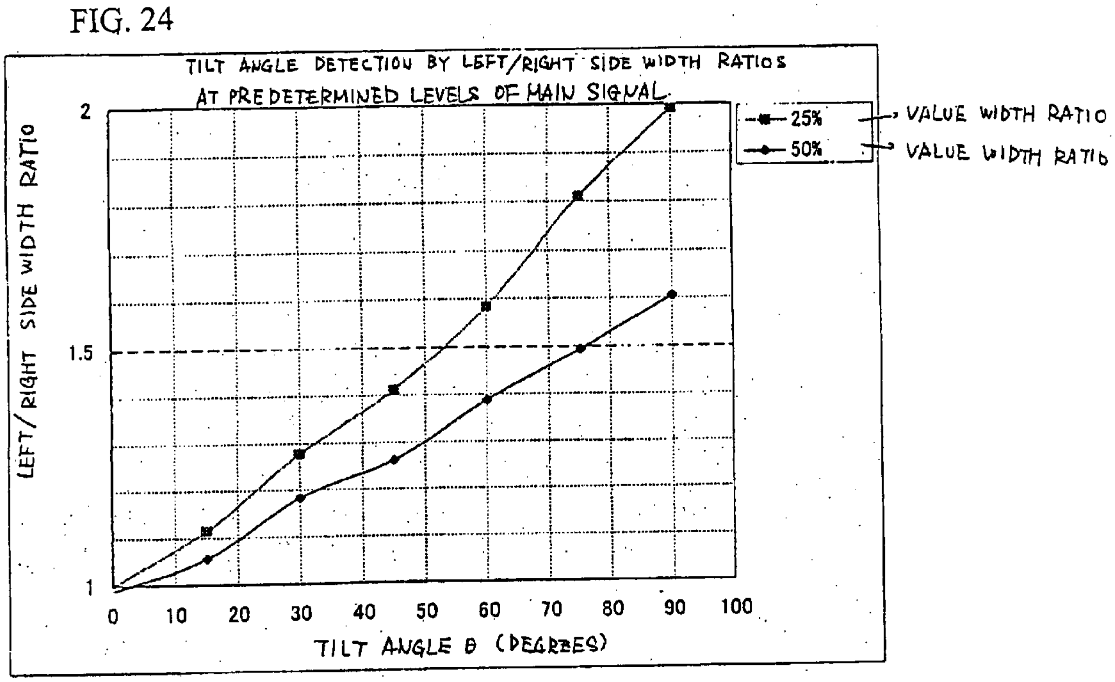
FIG. 24 is a table showing the relationship between the half value width ratio and the tilt angle and the relationship between the ration of 25% value width and the tilt angle, in the first embodiment.

FIG. 23 is a characteristic view illustrating the forgoing explanation. In FIG. 23, processing is shown that is performed when the tilt angle θ and the azimuth angle ϕ are calculated from the ratio of 25% value widths in the main signal of a detection signal (i.e., the ratio of the left side width to the right side width in 25% of the peak value of the main signal). FIG. 24 is a table showing the relationship between the half value width ratio and the tilt angle θ, and the relationship between the ration of 25% value width and the tilt angle θ. Namely, FIG. 24 is an angle dependency table of the left/right width ratio, and is stored in the memory 204 in advance. Thereby, it is possible to calculate the left/right width ratio at a predetermined level in a main signal, and calculate the tilt angle θ and the azimuth angle ϕ making reference to the above-described angle dependency table of the left/right width ratio. The X-coordinate and the Y-coordinate are corrected by using the obtained tilt angle θ and azimuth angle ϕ, thereby providing correct X-coordinates and Y-coordinates.

On the other hand, when the input element is parallel with the detection surface of the detecting device 112 (i.e., tilt angle θ=90 degrees), and parallel with the X-axis or the Y-axis (i.e., azimuth angle ϕ=0, 90, 180, or 270 degrees), the detection signal distribution of either of the X-axis component and the Y-axis component becomes flat, so that a coordinate become indeterminate.

Figure 25:
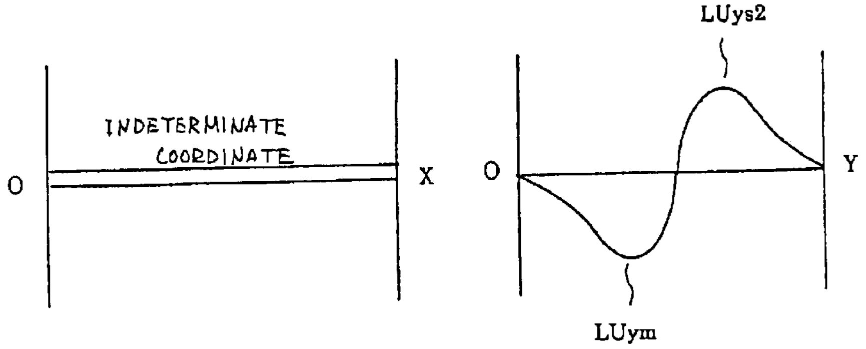
FIG. 25 is a characteristic view showing what occurs when the input element is parallel with the detection surface, and parallel with the X-axis or Y-axis in the first embodiment.
Figure 26:
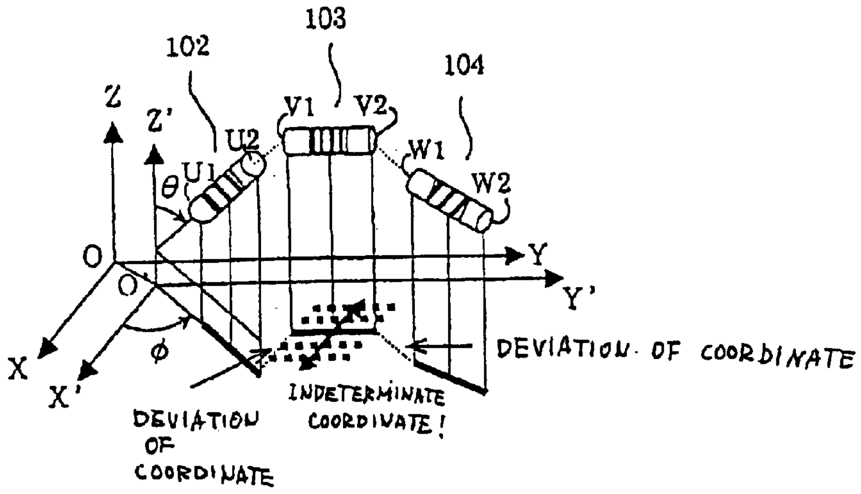
FIG. 26 is a schematic view explaining the occurrence of the deviation of coordinate axes or the indeterminateness of a coordinate in the first embodiment.

FIGS. 25 and 26 are representations explaining this phenomenon. Meanwhile, in FIG. 26, the input elements 102 to 104 are depicted as being separated from one another for purposes of explanation, but in reality, they are connected with one another so that the opposite ends thereof conform to each other.

FIG. 25 shows an X sensor coil detection signal (FIG. 25A) and Y sensor coil detection signals (FIG. 25B) at θ=90 degrees and φ=90 degrees. With regard to the detection signal of a Y-axis component, the valley value LUym and a right side sub-signal LUys2 are detected. However, the detection signal of an X-axis component becomes flat without any peak or valley being detected. As a result, as shown in FIG. 26, deviation of detected coordinate axes is caused. This inhibits detection such that the coordinates and/or directions of each of the input elements 102 and 104 become continuous, and/or makes coordinates indeterminate.

Even in this case, if the three-dimensional coordinates and the directions of any one of the three input elements 102 to 104 are properly detected, the input elements 102 to 104 can be connected so as to be continuous, by performing weighted mean calculations of the X-axis coordinate, the Y-axis coordinate, and the Z-axis coordinate (height) with the magnitudes of respective signals.

Figure 27:
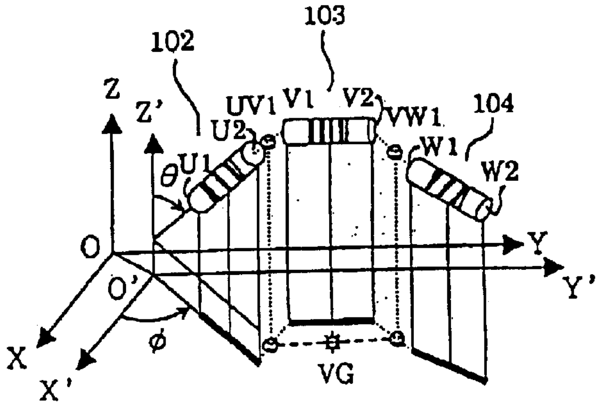
FIG. 27 is a schematic view explaining processing for making the input elements continuous in the first embodiment.

FIG. 27 is a schematic view explaining a connecting process for making the coordinates of the input elements 102 to 104 continuous. In FIG. 27, the input elements 102 to 104 are depicted as being separated from one another for purposes of explanation, but in reality, they are connected with one another so that the opposite ends thereof conform to each other. Specifically, the plurality of input elements connected with one another is arranged so that the opposite ends thereof conform to each other. More specifically, one end V1 of the input element 103 conforms to the other end U2 of the input element 102, and the other end V2 of the input element 103 conforms to one end W1 of the input element 104. The lengths of the input elements 102 to 104 may be different from one another, but in this embodiment, these input elements are formed into the same predetermined length.

Descriptions are made of processing for connecting the input elements 102 to 104, taking the input elements 102 and 103 as an example. It is first made sure that the input elements 102 and 103 have the same directions, and then in FIG. 27, from the coordinates of the ends (the end U2 of the input element 102 and the end V1 of the input element 103), where the input elements 102 and 103 are connected with each other, weighted mean position coordinates (weighted mean position) UV1 is calculated. Likewise, with regard to the ends V2 and W1, where the input elements 103 and 104 are connected with each other, a weighted mean VW1 is determined.

The weighted mean barycentric point VG at the center of the input element 103 is further calculated.

Thereafter, the calculation of each of the coordinates is performed by making processing against the course in which the above-described processing has been performed. That is, a half length of each of the input elements is vectorially added with respect to the above-described weighted mean barycentric point VG, and the connection points (joints) between the ends such as V1 and U2 are caused to conform to each other, whereby three-dimensional coordinates of the ends U1 and W2, respectively, of the input elements 102 and 104 are lastly determined.

The above-described processing is described in more detail. When the Z-coordinate of each of the input elements 102 to 104 is large (i.e., when each of the input elements 102 to 104 is located at a high position with respect to the detecting device 112), the detection signals fluctuate and cause jitter, thereby making correct signals difficult to obtain. This can make coordinates instable. To prevent coordinates from being instable, weighted mean processing is performed with respect to the Z-coordinates using the following expressions. In the expression below, weights (height weight) Zu_wei, Zv_wei, and Zw_wei of the Z-coordinates (height components), respectively, of the input elements 102 to 104 are calculated.

$$Zu\_wei=(1-Zu/250)^2$$

$$Zv\_wei=(1-Zv/250)^2$$

$$Zw\_wei=(1-Zw/250)^2$$

When each of the input elements 102 to 104 becomes nearly parallel with the X sensor coils or the Y sensor coils, the detection signal decreases, which can reduce detection accuracy. Furthermore, when each of the input elements 102 to 104 becomes completely parallel with the X sensor coils or the Y sensor coils, the detection of coordinates becomes impossible (i.e., coordinate become indeterminate). Therefore, in order to improve the detection accuracy, the detection signal is subjected to weighted mean processing in accordance with directions and a height of the input element.

Specifically, weighing element Uxz0, Uyz0, Vxz0, Vyz0, Wxz0, and Wyz0 by the direction vector components (X components Ux, Vx, and Wx: Y components Uy, Vy, and Wy: and Z components Uz, Vz, and Wz) of each of the input elements 102 to 104 are calculated.

$$Uxz0=Ux^2+Uz^2:Uyz0=Uy^2+Uz^2$$

$$Vxz0=Vx^2+Vz^2:Vyz0=Vy^2+Vz^2$$

$$Wxz0=Wx^2+Wz^2:Wyz0=Wy^2+Wz^2$$

Next, Uxz, Uyz, Vxz, Vyz, Wxz, and Wyz are calculated by multiplying the weighting elements Uxz0, Uyz0, Vxz0, Vyz0, Wxz0, and Wyz0 by the height weights.

$$Uxz=Uxz0*Zu\_wei:Uyz=Uyz0*Zu\_wei$$

$$Vxz=Vxz0*Zv\_wei:Vyz=Vyz0*Zv\_wei$$

$$Wxz=Wxz0*Zw\_wei:Wyz=Wyz0*Zw\_wei$$

Next, weighted means of the ends of the input elements 102 to 104 mutually connected are calculated. For example, weighted means XGuv1, YGuv1, and ZGuv1 of the ends at which the input elements 102 and 103 are connected with each other, are shown by the following expressions. The same goes for the end at which the input elements 103 and 104.

$$XGuv1=(Uxz*Xu2+Vxz*Xv1)/(Uxz+Vxz)$$

$$YGuv1=(Uyz*Yu2+Vyz*Yv1)/(Uyz+Vyz)$$

$$ZGuv1=(Zu\_wei*Zu2+Zv\_wei*Zv1)/(Zu\_wei+Zv\_wei)$$

Employing weighted means, the barycenter VG (XGv, YGv, ZGv) of the center of the input element 103 is calculated by the following expressions.

$$XGv=((Uxz+Vxz)*XGuv1+(Vxz+Wxz)*XGvw1)/(Uxz+2*Vxz+Wxz)$$

$$YGv=((Uyz+Vyz)*YGuv1+(Vyz+Wyz)*YGvw1)/(Uyz+2*Vyz+Wyz)$$

$$ZGv=((Zu\_wei+Zv\_wei)*ZGuv1+(Zv\_wei+Zw\_wei)*ZGvw1)/(Zu\_wei+2*Zv\_wei+Zw\_wei)$$

Thereafter, the calculation of each of the coordinates is performed by making processing against the course in which the above-described processing has been performed. That is, a half length of each of the input elements 102 to 104 is vectorially added with respect to the central coordinate VG of the input element 103, and the connection points (joints) between the ends such as V1 and U2 are caused to conform to each another, whereby three-dimensional coordinates of the ends U1 and W2, respectively, of the input elements 102 and 104 are lastly obtained.

Specifically, by vectorially adding a half-length of the input element 103 with respect to the central coordinate VG of the input element 103, the coordinates of each of both ends V1 and V2 of the input element 103 are determined. Here, the coordinates of the one end V1 of the input element 103 equals the other end U2 of the input element 102, and the coordinates of the other end V2 of the input element 103 equals the one end W1 of the input element 104.

By vectorially adding a half-length of the input element 102 with respect to the coordinates of the one end V1 of the input element 103 (i.e., the coordinates of the other end U2 of the input element 102), the coordinates of the center of the input element 102 are determined. Then, by vectorially adding a half-length of the input element 102 with respect to the coordinates of the above-described central coordinates of the input element 102, the coordinates of the one end U1 of the input element 102 are determined.

Likewise, by vectorially adding a half-length of the input element 104 with respect to the coordinates of the other end V2 of the input element 103 (i.e., the coordinates of the one end W1 of the input element 104), the coordinates of the center of the input element 104 are determined. Then, by vectorially adding a half-length of the input element 104 with respect to the coordinates of the above-described central coordinates of the input element 104, the coordinates of the other end W2 of the input element 104 are determined.

The above-described processing makes it possible to determine coordinates and directions of each of the plurality of input elements 102 to 104, which are linked in a chain shape, so as to be continuous.

Hereinafter, by performing the above-described processing for each predetermined time, the coordinates and the directions, which vary every moment, of each of the input elements 102 to 104 can be detected. This allows the detection of movements of the input device 101 and motion of human body equipped with the input device 101.

Next, a second embodiment of the present invention will be described. When the input device has only a single input coil, if the input device is horizontally positioned (i.e., in parallel with the detection surface) as well as positioned in parallel with the X sensor coils or the Y sensor coils, the X sensor coils or the Y sensor coils, which are parallel with the input device, cannot be electromagnetically coupled to the input coil, so that they cannot obtain a detection signal. This can make the detection of coordinates impracticable, i.e., can make a coordinate indeterminate (see the above-described first embodiment). This second embodiment is for preventing the occurrence of such a problem.

Figure 28:
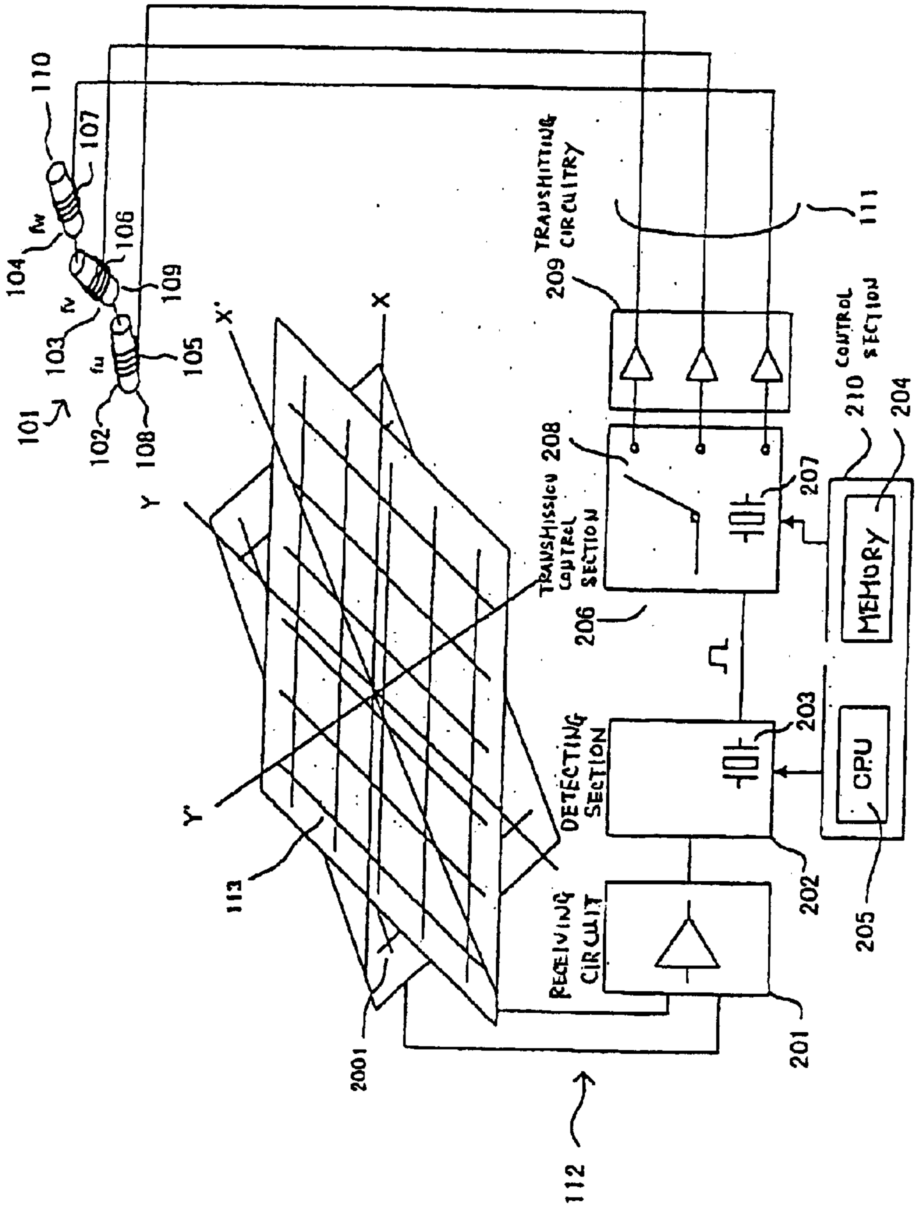
FIG. 28 is a block diagram of a motion capture system in a second embodiment of present invention.

FIG. 28 is a block diagram of a motion capture system according to the second embodiment, in which the same or functionally equivalent parts are designated with the same reference numerals as those in FIG. 2.

The motion capture system shown in FIG. 28 differs from that shown in FIG. 2 in that oblique sensor coils 2001 are arranged in a state in which sensor coils with the same configuration as that of the sensor coils 113 are rotated by a predetermined angle (45 degrees in this embodiment) on the detection surface, and in which they are superimposed on the sensor coils 113.

The sensor coils 113 comprise a plurality of X sensor coils arranged side by side along the X-axis direction (ϕ=0 degree), and a plurality of Y sensor coils arranged side by side along the Y-axis direction (ϕ=90 degrees). The oblique sensor coils 2001 comprise a plurality of X' sensor coils arranged side by side along the X'-axis direction (ϕ=45 degrees) rotated by 45 degrees from the X-axis direction, and a plurality of Y' sensor coils arranged side by side along the Y'-axis direction (ϕ=135 degrees) perpendicular to the X' sensor coils.

Figure 29:
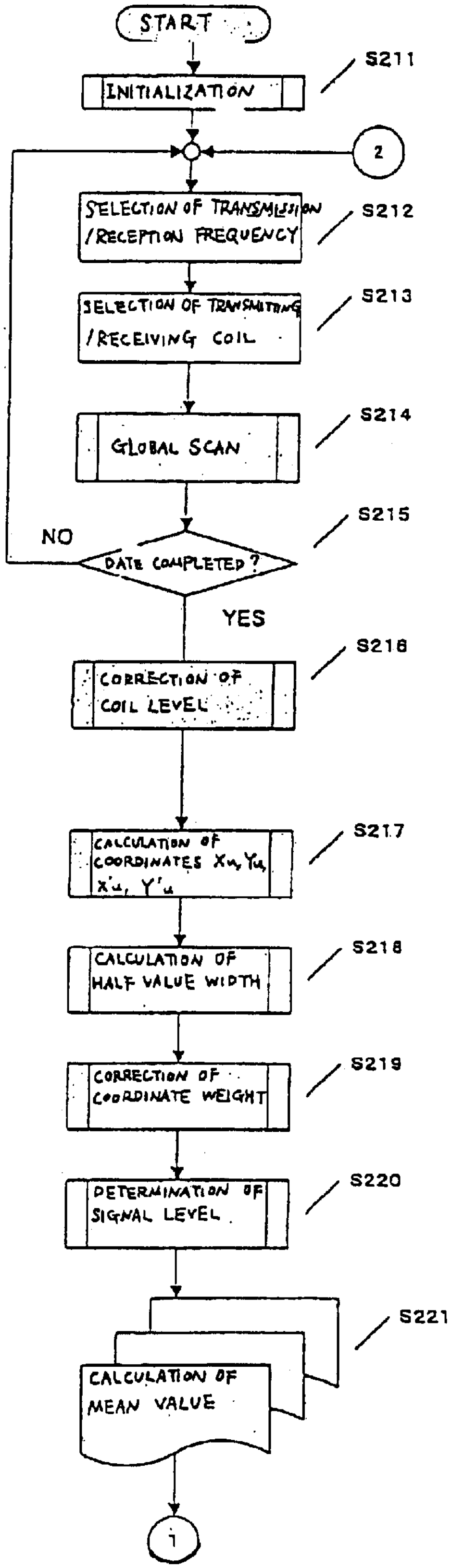
FIG. 29 is a flowchart showing process steps for the motion capture system according to the second embodiment.
Figure 30:
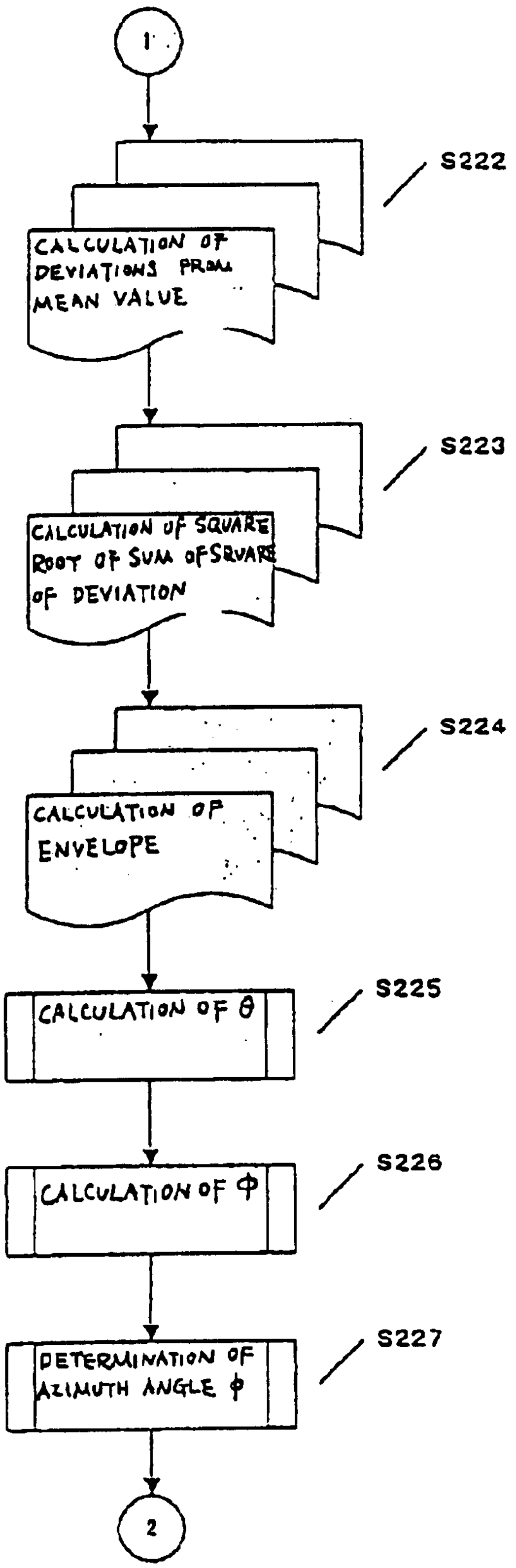
FIG. 30 is another flowchart showing process steps for the motion capture system according to the second embodiment.

FIGS. 29 and 30 are flowcharts of process steps in the motion capture system according to the second embodiment.

The operation of the second embodiment will be described in detail with reference to FIG. 28 to 30. For convenience of explanation, description is mainly made on the processing with respect to the input element 102. However, the other input elements 103 and 104 are also subjected to the same processing as that with respect to the input element 102. Thus, three-dimensional coordinates and directions of all input elements 102 to 104 are detected.

First, initialization processing is performed in step S211 in FIG. 29, with respect to the memory 204 provided in the control section 210 of the detecting device 112, and the buffer memories provided in the CPU 205, the transmission control section 206, the control section 210, and the detecting section 202.

Next, a signal of the frequency fu is transmitted from the detecting device 112 to the input device 101. The signal from the input device 101 is received and detected by the detecting device 112 by electromagnetic coupling.

First, by switching the selector 208 of the transmission control section 206, the frequency of a signal to be transmitted to the input device 101 is selected in step S212.

Next, as described above with reference to FIG. 4, the sensor coil 113 and the oblique sensor coil 2001, each of which receives signals from the input device 101 by electromagnetic coupling, are selected by sequentially switching by the control section 210 in step S213.

In this situation, a global scan is performed in which signals outputted from input device 101 are sequentially received by the sensor coils 113 and the oblique sensor coils 2001 to thereby perform level detection in step S214.

In the global scan, the transmission control section 206 outputs a signal of the frequency fu to the transmitting circuitry 209. The transmitting circuitry 209 supplies the signal of the frequency fu inputted from the transmission control section 206 to the input device 101 through the signal cable 111. The selected sensor coil 113 and oblique sensor coil 2001 receive the signal from the input device 101 by electromagnetic coupling. The detecting section 202 receives the signal that has been received by the aforementioned sensor coil 109 and oblique sensor coil 2001 through the receiving circuit 201, and detects the level of the signal. Then, the detection level of the signal received from input device 101, and the data on the sensor coils 113 and 2001 corresponding to the aforementioned detection level are stored in memory 204.

Next, it is determined whether the above-described operations have been performed with respect to all sensor coils 113 and all oblique sensor coils 2001 in step S215. If it is determined that the above-described operations have not been performed with respect to all sensor coils 113 and 2001, the processing returns to step S212. If it is determined that the above-described operations have been performed with respect to all sensor coils 113 and 2001, the processing proceeds to step S216.

Each of the above-described processes is performed with respect to all input elements 102 to 104. With respect to the input elements 103 and 104, the processing is performed by using respective frequencies fv and fw by switching the selector circuit 208 as in the case of the first embodiment.

In step S216, in a manner similar to the level correction of the sensor coils using the tables shown in FIGS. 9 to 12 in the first embodiment, variations in the sensitivity of the reception levels of the X sensor coils and the Y sensor coils of the sensor coils 113, and of the X' sensor coils and the Y' sensor coils of the oblique sensor coils 2001 are corrected, making reference to a level correction table stored in the memory 204 in advance. Also, in step S216, for the tilt angle θ=0, the peak values of the signal levels detected by the Y sensor coils, X' sensor coils, and Y' sensor coils are corrected so as to conform to the peak level of the signal level detected by the X sensor coils.

Figures 31, 32:
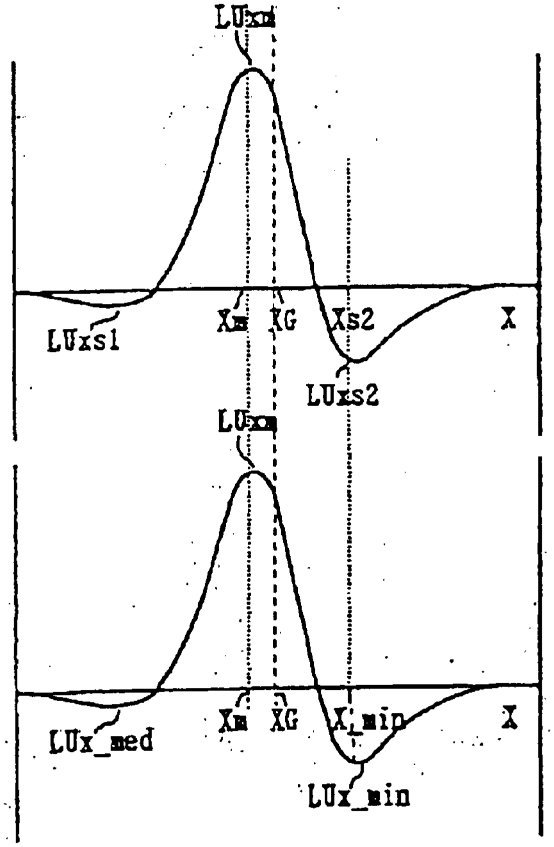
FIG. 31 is a diagram showing characteristics of signals detected by X sensor coils in the second embodiment.
FIG. 32 is an azimuth angle table used for the second embodiment.

Then, in step S217, with respect to each of the X sensor coil group, the Y sensor coil group, the X' sensor coil group, and the Y' sensor coil group, the X-coordinate Xm of the maximum level point in the X sensor coils is calculated, and the level at this coordinate is calculated as the maximum signal level LUxm, using a well-known method employing a parabola approximation, based on the detection signal level at the maximum level point of the detection signals of each of the sensor coil groups and the detection signal levels of two points in the vicinity of the aforementioned maximum level point. Likewise, the Y-coordinate Ym at the maximum level point in the Y sensor coils is calculated, and the level at this coordinate is calculated as the maximum signal level LUym. The X' coordinate X'm at the maximum level point in the X' sensor coils is calculated, and the level at this coordinate is calculated as the maximum signal level LUx'm. The Y' coordinate Y'm at the maximum level point in the Y' sensor coils is calculated, and the level at this coordinate is calculated as the maximum signal level LUy'm. FIG. 31 is a characteristic view of signals detected by X sensor coils in the above-described operations. In FIG. 31, it is shown that the detection of negative signals can also be performed (i.e., the detection of signals having both the positive and negative polarities is possible).

Next, the half value width of the maximum signal level of the pen signal fu is calculated in step S218.

Then, in a manner as described below, from the coordinates detected by the X sensor coils, the Y sensor coils, the X' sensor coils, and the Y' sensor coils, the weighted means by the signal intensities of these coils are calculated, and thereby barycentric coordinates are determined, thus providing correct barycentric coordinates in step S219. Herein, from three kinds of sensor coils out of the X sensor coils, the Y sensor coils, the X' sensor coils, and the Y' sensor coils, the same X-coordinate (or Y-coordinate) can be mutually independently obtained. However, these three signals are different in the signal intensity from one another. The lower the signal intensity, the larger the error due to signal jitters or the like. In other words, as the signal intensity increases, data with higher reliability can be obtained. Therefore, in order to obtain correct barycentric coordinates, the weighted mean is used in accordance with the signal intensity, rather than the simple mean.

For example, as in FIG. 31, when the detection of negative signals is possible (i.e., when the detection of signals having both the positive and negative polarities is possible) and also a main signal has a positive polarity, the coordinate of the one having a larger absolute value out of two sub-signals is always necessary. Therefore, if |LUxs1|<|LUxs2|, the coordinate Xs2 of a right side lobe is firstly detected. Then, the signal levels detected by the Y sensor coils, the X' sensor coils, and Y' sensor coils are multiplied by predetermined coefficients to conform to the signal level of the X sensor coils. As the aforementioned predetermined coefficients, for example, by acquiring data on the central portion of the detection surface of the detecting device 102 under the conditions: height=100 mm and tilt angle=θ, coefficients that allow the detection signal levels of the Y sensor coils, the X' sensor coils, Y' sensor coils to conform to the signal level of the X sensor coils are prepared in advance. For example, the aforementioned predetermined coefficients are selected as follows: LUx=1*LUx, LUx'=1.455*LUx', LUy=1.123*LUy, LUy'=1.325*LUy'

Next, by performing magnitude determination, LUx_med and LUx_min are obtained. Here, LUx_med is an intermediate value among LUxs1, LUxm, and LUxs2 (i.e., LUx_med=Median (LUxs1, LUxm, LUxs2)), or is the larger value between LUxs1 and LUxs2 (i.e., LUx_med=Max (LUxs1, LUxs2)). On the other hand, LUx_min is a minimum value among LUxs1, LUxm, and LUxs2 (i.e., LUx_min=Min (LUxs1, LUxm, LUxs2)), or is the smaller value between LUxs1 and LUxs2 (i.e., LUx_min=Min (LUxs1, LUxs2)).

Here, between LUxs1 and LUxs2, the larger one is assumed as LUx_med, and the smaller one is assumed as LUxmin.

Then, the coordinate on the X sensors (ϕ=0 degree) is determined from the following expression.

$$XG=((LUxm-LUx\_min)*Xm+(LUx\_med-LUx\_min)*X\_min)/(LUxm-2*LUx\_min+LUx\_med)$$

Likewise, the coordinate on the X' sensors (ϕ=45 degree) is determined from the following expression.

$$X'G=((LUx'm-LUx'\_min)*X'm+(LUx'\_med-LUx'\_min)*X'\_min)/(LUx'm-2*LUx'\_min+LUx'\_med)$$

Next, the coordinate on the Y sensors (ϕ=90 degree) is determined from the following expression.

$$YG=((LUym-LUy\_min)*Ym+(LUy\_med-LUy\_min)*Y\_min)/(LUym-2*LUy\_min+LUy\_med)$$

Lastly, the coordinate on the Y' sensors (ϕ=135 degree) is determined from the following expression.

$$Y'G=((LUy'm-LUy'\_min)*Y'm+(LUy'\_med-LUy'\_min)*Y'\_min)/(LUy'm-2*LUy'\_min+LUy'\_med)$$

Letting the origins (in this embodiment, the respective central portions of the sensor coils 113 and the oblique sensor coils 2001) of the X, X', Y, and Y' sensor coils be respectively XO, X'O, YO, and Y'O, the coil barycentric coordinates (XGG, YGG) are represented by the following expression, using weighted means.

$$\Delta XG=XG-XO$$

$$\Delta X'G=X'G-X'O$$

$$\Delta YG=YG-YO$$

$$\Delta Y'G=Y'G-Y'O$$

$$XGG=XO+(LUxm*\Delta XG+LUx'm*(\Delta X'G/\sqrt{2})-LUy'm*(\Delta Y'G/\sqrt{2}))/(LUxm+LUx'm+LUy'm)$$

$$YGG=YO+(LUx'm*(\Delta X'G/\sqrt{2})+LUym*\Delta YG+LUy'm*(\Delta Y'G/\sqrt{2}))/(LUx'm+LUym+LUy'm)$$

Next, the minimum signal level LUxmin and the like, the intermediate signal level LUxmed and the like of the detection signal detected by the X sensor coils, the X' sensor coils, the Y sensor coils, and the Y' sensor coils are determined in step S220.

Then, the mean value LUm_av of the main signal level, the mean value LUmin_av of the minimum signal level, and the mean value LUmed_av of the intermediate signal level of the detection signals detected by the X sensor coils, the X' sensor coils, the Y sensor coils, and the Y' sensor coils, are determined in step S221 by the following expressions.

$$LUm\_av=(LUxm+LUx'm+LUym+LUy'm)/4$$

$$LUmin\_av=(LUxmin+LUx'min+LUymin+LUy'min)/4$$

$$LUmed\_av=(LUxmed+LUx'med+LUymed+LUy'med)/4$$

Here, the main signal levels of the X sensor coils, the X' sensor coils, the Y sensor coils, and the Y' sensor coils are designated by LUxm, LUx'm, LUym, and LUy'm, respectively. The minimum signal levels of these respective sensor coils are designated by LUxmin, LUx'min, LUymin, and LUy'min. Also, the intermediate signal levels of these respective sensor coils are designated by LUxmed, LUx'med, LUymed, and LUy'med.

Now, the deviations, from the above-described mean values, of the main signal levels, the minimum signal levels, and the intermediate signal levels of the detection signals detected by the X sensor coils, the Y sensor coils, the X' sensor coils, and the Y' sensor coils are calculated in step S222 using the following expressions.

$$LUxm\_dev=LUxm-LUm\_av$$

$$LUx'm\_dev=LUx'm-LUm\_av$$

$$LUym\_dev=LUym-LUm\_av$$

$$LUy'm\_dev=LUy'm-LUm\_av$$

Here, the deviations of the maximum value signal levels of the X sensor coils, the X' sensor coils, the Y sensor coils, and the Y' sensor coil are represented by LUxm_dev, LUx'm_dev, LUym_dev, and LUy'm_dev, respectively.

Furthermore, $$LUxmin\_dev=LUxmin-LUmin\_av$$

$$LUx'min\_dev=LUx'min-LUmin\_av$$

$$LUymin\_dev=LUymin-LUmin\_av$$

$$LUy'min\_dev=LUy'min-LUmin\_av$$

Here, the deviations of the minimum value signal levels of the X sensor coils, the X' sensor coils, the Y sensor coils, and the Y' sensor coils are represented by LUxmin_dev, LUx'min_dev, LUymin_dev, and LUy'min_dev, respectively.

Moreover, $$LUxmed\_dev=LUxmed-LUmed\_av$$

$$LUx'med\_dev=LUx'med-LUmed\_av$$

$$LUymed\_dev=LUymed-LUmed\_av$$

$$LUy'med\_dev=LUy'med-LUmed\_av$$

Here, the deviations of the intermediate maximum signal levels of the X sensor coil, the X' sensor coil, the Y sensor coil, and the Y' sensor coils are designated by LUxmed_dev, LUx'med_dev, LUymed_dev, and LUy'med_dev, respectively.

The square roots of the sums of the squares of the aforementioned deviations are calculated in step S223 using the following expressions.

$$LUm\_am=\sqrt{((LUxm\_dev^2+LUx'm\_dev^2+LUym\_dev^2+LUy'm\_dev^2)/2)}$$

$$LUmin\_am=\sqrt{((LUxmin\_dev^2+LUx'min\_dev^2+LUymin\_dev^2+LUy'min\_dev^2)/2)}$$

$$LUmed\_am=\sqrt{((LUxmed\_dev^2+LUx'med\_dev^2+LUymed\_dev^2+LUy'med\_dev^2)/2)}$$

Here, the square roots of the sums of the squares of the deviations of the main signal, the minimum signal, and the intermediate signal are designated by LUm_am, LUmin_am, LUmed_am, respectively.

Then, the envelopes of the main signal, the minimum signal, and the intermediate signal are determined in step S224 by the following expressions.

$$LUm\_en=LUm\_av+LUm\_am$$

$$LUmin\_en=LUmin\_av-LUmin\_am$$

$$LUmed\_en=LUmed\_av-LUmed\_am$$

Here, the envelopes of the main signal, the minimum signal, and the intermediate signal are designated by LUm_en, LUmin_en, and LUmed_en, respectively.

Next, the tilt angle θ is calculated from an envelope ratio in step S225 using the following expressions.

$$ratio=(LUmed\_en-LUmin\_en)/(LUm\_en-LUmin\_en)$$

$$\theta=ratio*180(degrees)$$

Then, by the discrete Fourier transformation (DFT), a temporary azimuth angle $\phi_0$ (temporary φ value represented as being in the range: −90 degrees$\leqq\phi_0\leqq$90 degrees) is calculated from the main signal, cos(2φ), and sin(2φ) in step S226 using the following expressions, $$\begin{aligned}&(Luxm*\sin(2*0°)+\\&(LUx'm*\sin(2*45°)+(LUym*\sin(2*90°)+(LUy'm*\sin(2*135°))/\\&(LUxm*\cos(2*0°)+(LUx'm*\cos(2*45°)+\\&(LUym*\cos(2*90°)+LUy'm*\cos(2*135°))=\\&(LUxm*0+LUx'm*1+LUym*0+(LUy'm*(-1))/\\&LUxm*1+LUx'm*0+LUym*(-1)+\\&LUy'm*0)=(LUx'm-LUy'm)/(LUxm-LUym)\end{aligned}$$

For example, we assume LUx'm=26074, LUy'm=20691, LUxm=23552, and LUym=24149, $$(LUx'm-LUy'm)/(LUxm-LUym)=5383/(-597)=-9.01675$$

Therefore, the temporary azimuth angle φo is $$\begin{aligned}\phi\circ&=(1/2)*\tan^{-1}((LUx'm-LUy'm)/(LUxm-LUym))*180/\pi\text{ (degrees)}\\&=(1/2)*\tan^{-1}(-9.01675)*180/\pi\text{ (degrees)}\\&=(1/2)*(-1.46034)*180/\pi\text{ (degrees)}\\&=0.73017*180/\pi\text{ (degrees)}\\&=-41.8\text{ (degrees)}\end{aligned}$$

Figure 33:
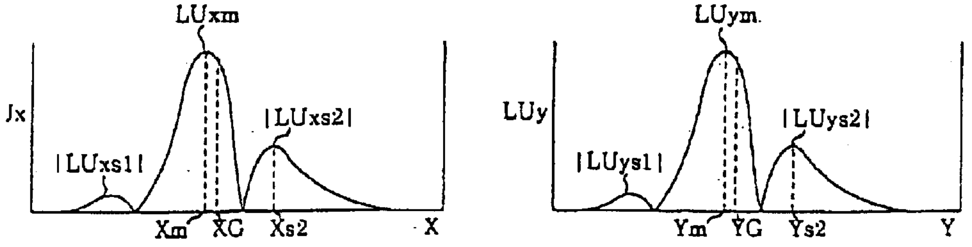
FIG. 33 is a representation explaining symbols used in the azimuth angle table for the second embodiment.
Figure 34:
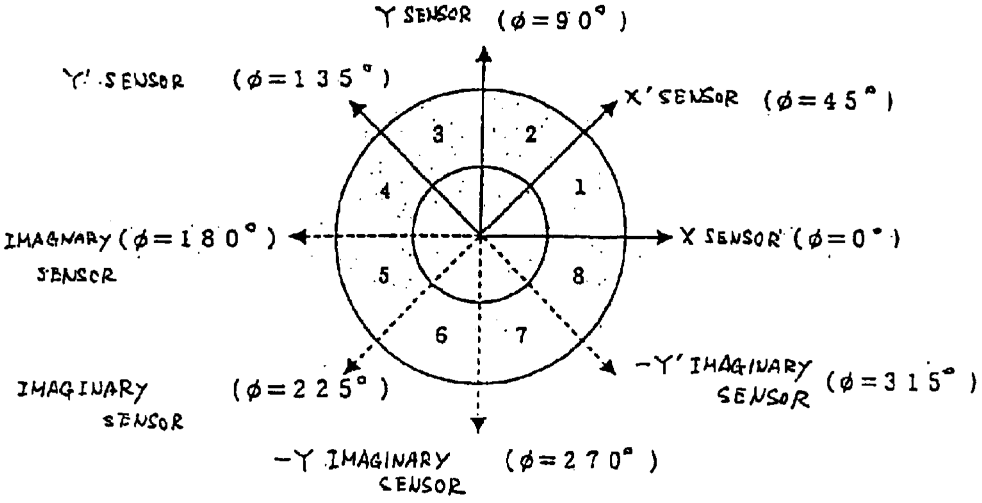
FIG. 34 is another representation explaining symbols used in the azimuth angle table for the second embodiment.

The quadrant is determined by the direction of the main signal of the right sub-signal LUs2 of the signals, the direction being determined by the three-point approximation method, and the correct azimuth angle $\phi$ is calculated from $\phi$o in step S227. FIG. 32 shows an azimuth angle table for calculating the azimuth angle $\phi$, which is stored in the memory 204 in advance. FIGS. 33 and 34 are representations explaining the symbols used in the aforementioned azimuth angle table. In FIG. 32, LUx's1, LUx's2, LUy's1, and LUy's2 denote the peak values of the sub-signals of the oblique sensor coils 2001.

From this azimuth angle table, it can be seen that the azimuth region is "2". For example, when the signal as shown in FIG. 33 is obtained, the general azimuth angle $\phi$ is represented by the following expression.

$$\phi=\phi o+90(\text{degrees})=-41.8+90(\text{degrees})=48.2(\text{degrees})$$

By repeating the above processing, it is possible to detect the X, Y, Z-coordinates, the azimuth angle $\phi$, and the tilt angle $\theta$ of the input device 101 in a three dimensional space.

In this way, the tilt angle $\theta$ and the azimuth angle $\phi$ can be determined from the sub-signal ratio of a detection signal, (LUx'm−LUy'm)/(LUxm−LUym).

Meanwhile, in this second embodiment also, correction processing with respect to the X, Y, and Z-coordinates may be made in the same manner as step S20 shown in FIG. 6.

Executing the above-described processing (steps S211 to S227) with respect to the input elements 103 and 104 makes it possible to detect the three-dimensional coordinates and directions of all input elements 102 and 104. The processing for smoothly connecting the input elements 103 and 104 can be made in the same manner as the above-described first embodiment.

As described above, according to this second embodiment, the providing of the oblique sensor coils 2001 prevents the detection of coordinates from being impracticable, i.e., inhibits coordinates from being indeterminate.

The crossing angle between the sensor coils 113 and the oblique coils 2001 is preferably 45 degrees from the viewpoint of arithmetic processing and the like. However, the crossing angle therebetween is not necessarily 45 degrees, but other crossing angles may be adopted. Also, by combining this second embodiment and a third embodiment, which is described later, it is possible to use the oblique coils 2001 as a plurality of X' sensor coils alone, or a plurality of Y' sensor coils alone.

According to a third embodiment of the present invention, a method for detecting the tilt angle $\theta$ and the azimuth angle $\phi$ from the ratio between the left and right sides of a detection signal is provided. The three-dimensional information detecting device according to this third embodiment differs from the above-described first embodiment in that the calculating methods for the tilt angle $\theta$ and the azimuth angle $\phi$ by means of CPU 205 are different. However, other configurations are the same as those of the first embodiment. References hereinafter are principally made to calculating methods for the tilt angle $\theta$ and the azimuth angle $\phi$.

Figure 35:
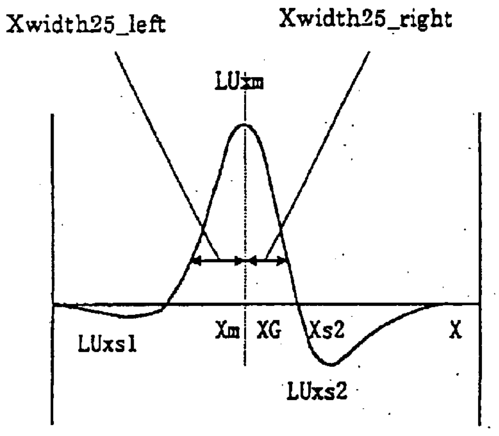
FIG. 35 is a representation of a main signal detected by X sensor coils and transmitted from an input element in the third embodiment.

FIG. 35 is a representation of the main signal LUx detected by the X sensor coil and transmitted from the input element 105. With respect to the X-coordinate Xm of the peak value of the main signal of a detection signal, the half value width of the left half-side of the main signal is designated as Xwidth50_left, and the half value width of the right half-side thereof is designated as Xwidth50_right. Also, the 25% value width of the left half-side of the main signal is designated as Xwidth25_left, and the 25% value width of the right half-side thereof is designated as Xwidth25_right.

In this embodiment, the half value width and the 25% value width are used, but these widths are not necessarily required to be used. Any predetermined widths in the vicinity of these widths may be adopted.

When widths and ratios are to be calculated, 50% value half-side widths, Xwidth50_left and Xwidth50_right are first calculated. Next, 25% value half-side widths, Xwidth25_left and Xwidth25_right are calculated. Then, left/right half-side width ratio of 50% value, Xwidth50_left/right=Xwidth50_left/Xwidth50_right is calculated. Thereafter, the left/right half-side width ratio of 25% value, Xwidth25_left/right=Xwidth25_left/Xwidth25_right is calculated.

Figure 36:
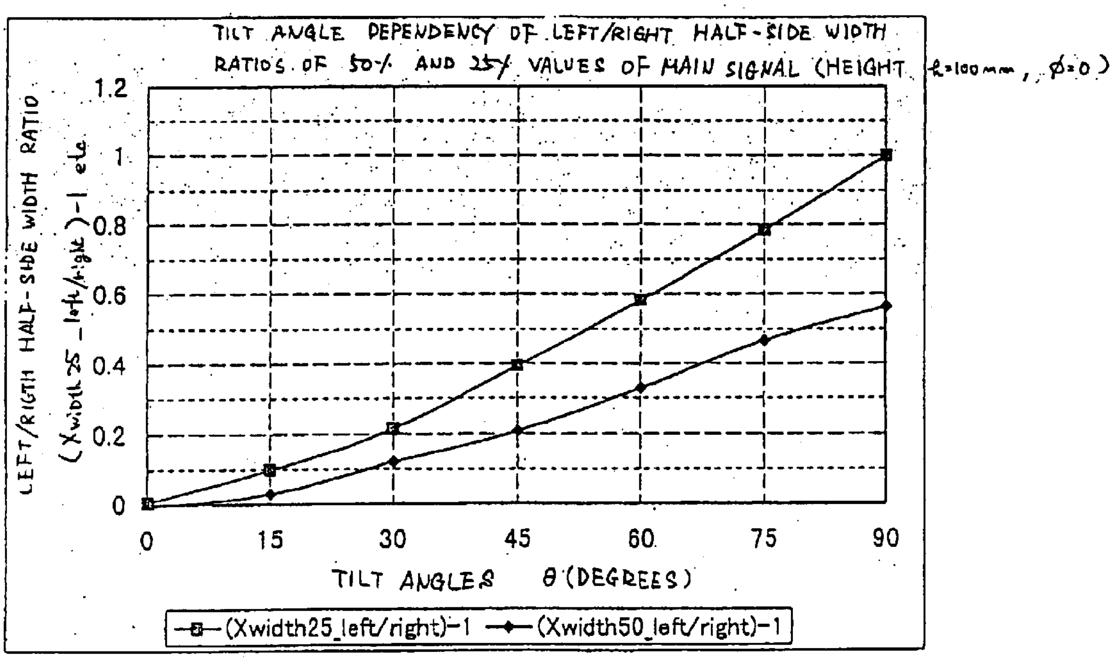
FIG. 36 is a table showing dependencies of left and right half-side width ratios of 50% and 25% values of a main signal on the tilt angle in the third embodiment.

Next, the tilt angle $\theta$ is detected. FIG. 36 shows the dependencies of the left/right half-side width ratios of 50% value and 25% value of the X sensor coil on the tilt angle $\theta$, at azimuth angle $\phi=0$ degree. The table for these dependencies of the left/right half-side width ratios on the tilt angle shown in FIG. 36 is stored in the memory 204 in advance.

Because the left/right half-side width ratio of 25% value changes smoothly compared with the 50% value, this left/right half-side width ratio of 25% value is adopted. Founding the vertical axis coordinate ((Xwidth25_left/right)−1) by using the table for the tilt angle dependencies of the half-side width ratios shown in FIG. 36 allows the detection of the tilt angle $\theta$.

Figure 37:
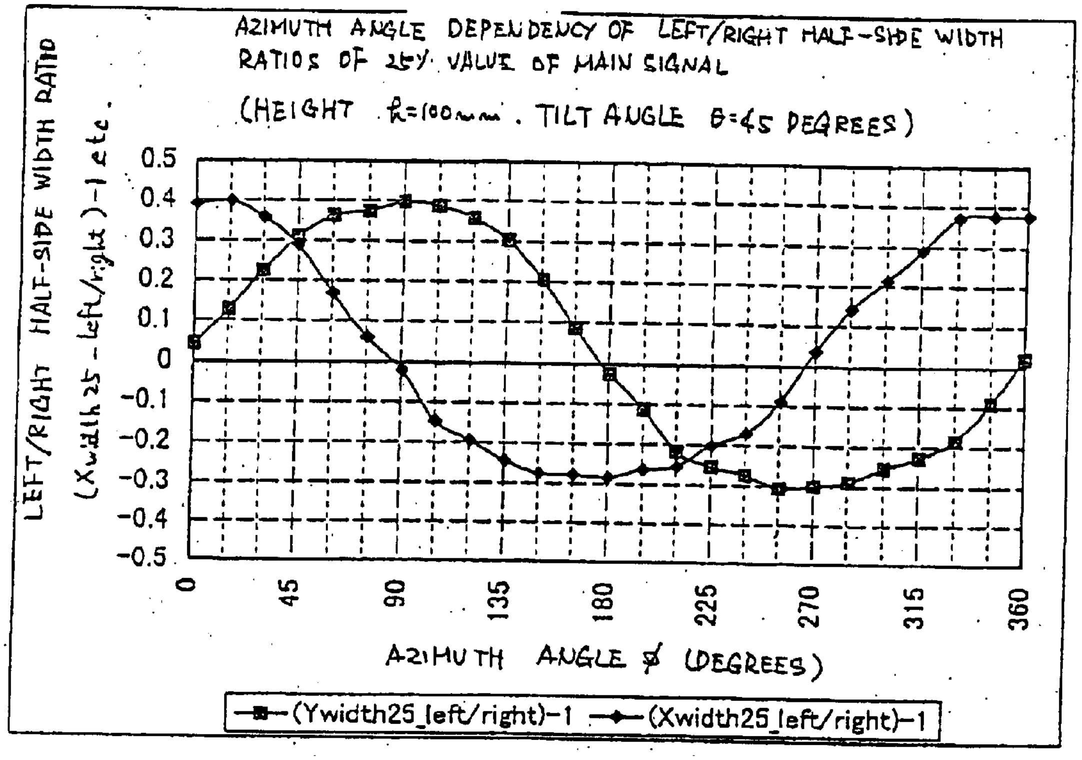
FIG. 37 is a table showing dependencies of the left and right half-side width ratios of 25% value of a main signal on the tilt angle in the third embodiment.

The azimuth angle $\phi$ is now detected. First, the left/right half-side width ratios of 25% value of the Y sensor coil are calculated. Using also the detection signals LUy of the Y sensor coils, the left/right half-side width ratio of 25% value, i.e., ((Ywidth25_left/right)−1) is calculated in the same manner. For example, when the azimuth angle $\phi$ is rotated from 0 to 360 degrees (one revolution), with the tilt angle $\theta$ kept at 45 degrees, the relationship between the left/right half-side width ratios of 25% value of the X and Y sensor coils and the azimuth angle $\phi$ is shown in FIG. 37. The table for the dependencies of the left/right half-side width ratios of 25% value on the tilt angles shown in FIG. 37 is stored in the memory 204 in advance.

Then, when the azimuth angle $\phi$ is to be calculated, the temporary azimuth angle $\phi_0$ is first determined by the following expression.

$$\phi o=\tan-1\ (((Ywith25\_left/right)-1)/((Xwith25\_left/right)-1))*180/\pi(\text{degrees})$$

Figures 38, 39:
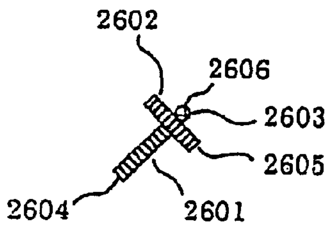
FIG. 38 is table showing the relationship between the temporary azimuth angle and the azimuth angle for the third embodiment.
FIG. 39 is a representation of an input element for motion capture according to another embodiment.

The relationship between the temporary azimuth angle $\phi_0$ and the azimuth angle $\phi$ is shown in FIG. 38. Specifically, FIG. 38 is an example (height=100 mm, tilt angle $\phi$=45 degrees) in which the general azimuth angles $\phi$ are obtained by determining a quadrant based on ((the left/right half-side width ratio of 25% value of the main signal)−1), sign ((Xwith25_left/right)−1), which denotes the sign of ((Xwith25_left/right)−1), and sign ((Ywith25_left/right)−1), which denotes the sign of ((Ywith25_left/right)−1). The quadrant determination table shown in FIG. 38 is stored in the memory 204 in advance. The general azimuth angle $\phi$ is calculated based on the height relation between left and right sub-signals of the detection signal LUx of the X sensor coil and the detection signal LUy of the Y sensor coil.

It is thus possible to determine the tilt angle $\theta$ and the azimuth angle $\phi$ of the input elements from the left/right half-side width ratio of a detection signal.

Next, other embodiments of the motion capture input device will be described. FIGS. 39 to 47 are representations of input elements of the motion capture input device according to other embodiments of the present invention. The motion capture input device is formed by combining a plurality of input elements out of the input elements shown in FIG. 8 and FIGS. 39 to 47, and connecting them so as to be relatively movable. As a method for combining input elements, a plurality of input elements of the same type alone may be combined, or alternatively, a plurality of input elements of the mutually different types may be combined. Anyhow, input elements to be combined may be appropriately selected in accordance with the intended use or the like. Also, some of the illustrated input elements may each be housed into a predetermined housing, and the plurality of input elements each housed in the housing may be connected with each other.

Figure 46:
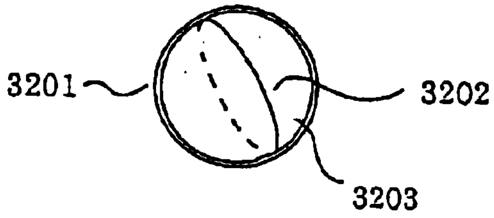
FIG. 46 is a perspective view of a motion capture input device element according to yet further embodiment.
Figure 47:
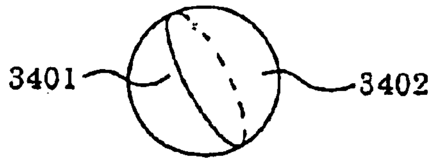
FIG. 47 is a perspective view of an input element for motion capture according to another embodiment.

Input elements, including the motion capture input device according to the above-described first embodiment, are broadly divided into input elements each having a plurality of input coils (see FIGS. 39 to 46) and those each having a single input coil (see FIGS. 8 and 47). Furthermore, the input elements having a plurality of input coils are divided into input elements having an arrangement in which the central position of at least one input coil thereof deviates from that of the other input coils (see FIGS. 39 to 42), and input elements having an arrangement in which all of the plurality of input coils has the same central position (see FIGS. 43 to 46).

The input elements shown in FIGS. 39 to 42 each have a plurality of input coils, and at least one input coil thereof is arranged so that the central position thereof deviates from those of the other input coils, and that the central axes of the plurality of input coils orthogonally intersect each other. Since the central positions of the input coils deviate, front/rear detection (detection as to whether the input element faces the detecting device or faces away therefrom) is feasible without establishing synchronization between the detecting device and the input device.

Referring to FIG. 39, an input element is configured so that a plurality of input coils 2601 to 2603, respectively, is wound around a plurality of cylindrical core 2604 to 2606 formed of a magnetic material. The input coils 2601 to 2603 are arranged so that the central positions thereof deviate from each other, and the central axes thereof orthogonally intersect each other.

Figure 40:
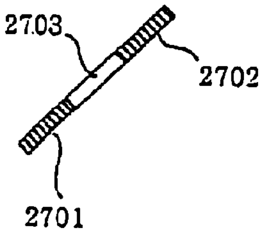
FIG. 40 is a representation of an input element for motion capture according to still another embodiment.

Referring to FIG. 40, an input element is configured so that plural (two) input coils 2701 and 2702 are wound around opposite ends of a single cylindrical core 2703 formed of a magnetic material. The input coils 2701 and 2702 are arranged so that the central positions thereof deviate from each other, and that the central axes thereof conform to each other.

Figure 41:
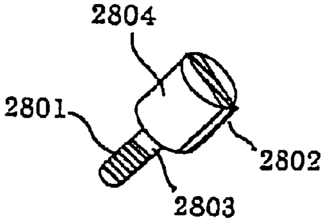
FIG. 41 is a perspective view of an input element for motion capture according to a further embodiment.

Referring to FIG. 41, an input element is configured so that input coils 2801 and 2802, respectively, are wound around a small-diameter cylindrical core 2803 formed of a magnetic material and a large-diameter cylindrical 2804 formed of a magnetic material. The input coils 2801 and 2802 are arranged so that the central positions thereof deviate from each other and that the central axes thereof orthogonally intersect each other.

Figure 42:
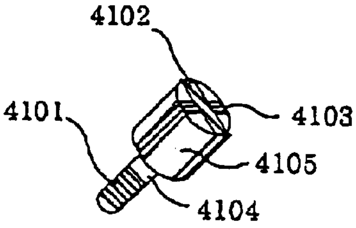
FIG. 42 is a perspective view of an input element for motion capture to a yet further embodiment.

Referring to FIG. 42, an input element has a small-diameter cylindrical core 4104 formed of a magnetic material, and a large-diameter cylindrical core 4105 formed of a magnetic material. An input coils 4101 is wound around the core 4104. Two input coils 4102 and 4103 are wound around the core 4105. The input coils 4102 and 4103 are arranged so that the central positions thereof conform to each other and that the central axes thereof orthogonally intersect each other. The input coil 4101 is arranged so that the central position thereof deviates from those of the input coils 4102 and 4103. The input coils 4101 to 4103 are arranged so that the central axes thereof orthogonally intersect each other.

The input elements shown in FIGS. 43 to 46 each have a plurality of input coils, and all input coils are arranged so that the central positions thereof conform to one another, and that the central axes thereof orthogonally intersect one another. Since the central positions of the input coils are in conformity with one another, front/rear detection cannot be performed unless synchronization between the detecting device and the input device is established.

Figure 43:
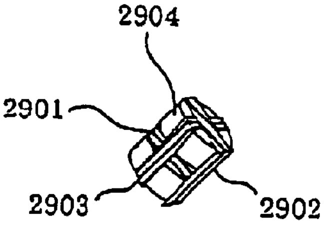
FIG. 43 is a perspective view of an input element for motion capture according to another embodiment.

Referring to FIG. 43, an input element is configured so that plural (three) input coils 2901 and 2903 are wound around a cylindrical core 2904 formed of a magnetic material. The input coils 2901 and 2903 are arranged so that the central positions thereof conform to one another, and that the central axes thereof orthogonally intersect one another.

Figure 44:
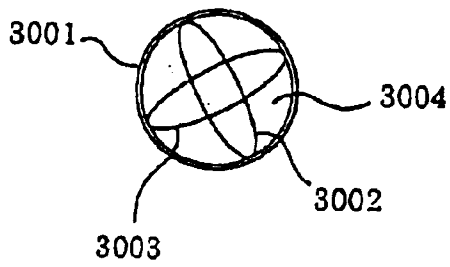
FIG. 44 is a perspective view of an input element for motion capture according to still another embodiment.

Referring to FIG. 44, an input element is configured so that a plurality of input coils 3001 to 3003 are wound within a sphere 3004. The input coils 3001 to 3003 are arranged so that the central positions thereof conform to one another, and that the central axes of the plurality of input coils orthogonally intersect one another.

Figure 45:
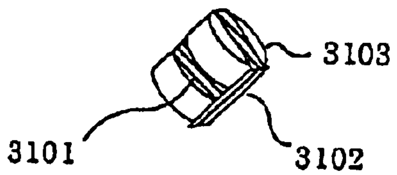
FIG. 45 is a perspective view of an input element for motion capture according to a further embodiment.

Referring to FIG. 45, an input element is configured so that plural (two) input coils 3101 and 3102 are wound around a single cylindrical core 3103 formed of a magnetic material. The input coils 3101 and 3102 are arranged so that the central positions thereof conform to each other, and that the central axes thereof orthogonally intersect each other.

Referring to FIG. 46, an input element is configured so that plural (two) of input coils 3201 and 3202 are wound within a sphere 3203. The input coils 3201 and 3202 are arranged so that the central positions thereof conform to each other, and that the central axes thereof orthogonally intersect each other.

The input element shown in FIG. 47 is an example of an input element having a single input coil. Since only a single input a coil is provided, front/rear detection cannot be performed unless synchronization between the detecting device and the input device is established.

Referring to FIG. 47, an input element is configured so that a single input coil 3401 is wound within a sphere 3402. The input coil 3401 is arranged so that the central position thereof conforms to the center of the sphere 3402.

In each of the above-described embodiments, the calculation of the coordinates, the azimuth angle $\phi$, or the tilt angle $\theta$ is made by making reference to the tables stored in memory 204 in advance. Alternatively, mathematical expressions (approximation expressions) for calculating the coordinates, the azimuth angle $\phi$, and the tilt angle $\theta$ may be stored in memory 204 in advance as a program. The mathematical expressions may then be executed by the CPU 205.

Also, in each of the above-described embodiments, signals generated by the sensor coils of the motion capture detecting device are received by the motion capture input device. The signals are transmitted from the motion capture input device to the motion capture detecting device. The signals from the motion capture input device are received by the identical sensor coil with the sensor coil that has sent the signals to the motion capture input device, whereby the position and the directions of the input element is detected on the motion capture input device side. However, the transmission and reception of signals may be performed by respective different sensor coils.

Furthermore, the input coils of the motion capture input device and the sensor coils of the motion capture detecting device may constitute an oscillation circuit, whereby the detecting device self-oscillates when the input device is present.

Moreover, the motion capture input device may be arranged to have a power supply or a power supply circuit for receiving a power supply from the outside, and also a signal generating circuit for generating signals to be communicated with the motion capture detecting device.

Also, the motion capture input device may be arranged to incorporate a power supply or a power supply circuit for receiving a power supply from the outside, a signal generating circuit for generating signals to be communicated, a transmitting/receiving circuits for the aforementioned signals, a calculating section, and a transmitting circuitry for transmitting the calculated results by radio such as infrared rays or electronic waves, while the motion capture detecting device is arranged to have a plurality of coils constituting a resonant circuit planarly formed. Signals transmitted from the input device side are received by the detecting device side and are sent back. The signals are received by the transmitting/receiving circuit of the input device, and three-dimensional information (three-dimensional coordinates and directions) about each of the input elements is calculated by the calculating section. The calculated results are transmitted to other devices, such as higher level devices, by the transmitting circuitry.

Furthermore, the motion capture input device may be arranged to incorporate a power supply or a power supply circuit for receiving a power supply from the outside, a signal generating circuit for generating signals to be communicated, a transmitting/receiving section for the aforementioned signals, a signal processing section for processing received signals into a predetermined transmission format, and a transmitting circuitry for transmitting these signal processing results by radio such as infrared rays or electronic waves, while the motion capture input device sensor side is arranged to include a plurality of sensor coils constituting a resonant circuit planarly or curvedly formed, and a calculating section that calculates a position and directions of the input device upon receipt of signals from the transmitting circuitry.

Moreover, the motion capture input device may be arranged to incorporate a power supply or a power supply circuit for receiving a power supply from the outside, a receiving section for signals, a signal processing section for processing received signals into a predetermined transmission format, and a transmitting circuitry for transmitting these signal processing results by radio such as infrared rays or electronic waves, while the motion capture input device is arranged to include a plurality of sensor coils constituting a resonant circuit, a selecting circuit for selectively switching the sensor coils, a signal generating circuit for generating signals to be communicated, a calculating section that calculates three-dimensional information about each of the input elements upon receipt of signals from the transmitting circuitry.

Furthermore, the motion capture input device three-dimensional information input device may be arranged to incorporate a power supply or a power supply circuit for receiving a power supply from the outside, a receiving section for signals, a three-dimensional information calculating section, a transmitting circuitry for transmitting the calculated results by radio such as infrared rays or electronic waves, while the motion capture input detecting device is arranged to include a plurality of sensor coils constituting a resonant circuit, and a signal generating circuit. Signals from the aforementioned signal generating circuit is transmitted to the input device while selecting one of the sensor coils by switching between the sensor coils, and three-dimensional information is calculated on the input device side to thereby transmit the calculated results by radio to other devices such as higher level devices.

Meanwhile, the external shape of each of the input elements may assume various shapes such as a cylindrical shape, a spherical shape, an ellipsoidal shape, and so on.

When the motion capture input device is configured to have an oscillation circuit, the input coil may be configured to have no oscillation circuit.

Also, when the motion capture detecting device is configured to have an oscillation circuit, the sensor coil may be configured to have no oscillation circuit.

Furthermore, when the input coil or the motion capture detecting device is configured to have an oscillation circuit, it is not always necessary that the frequency of communicated signals is in complete conformity with the resonant frequency of the above-described resonant circuit. Any signals having a frequency different from the resonant frequency but being in the range of allowing substantial received signals to be obtained, that is, signals related to the resonant frequency, may be adopted.

As described above, the motion capture system according to the embodiments of the present invention especially includes a plurality of input elements each of which has at least one input coil, and which is connected with each other so as to be relatively movable; a plurality of sensor coils which is disposed along a detection surface so as to intersect each other, and each of which is electromagnetically coupled to a respective one of the input coils; a selecting means for selectively switching the sensor coils; signal generating means for generating signals to be communicated between each of the input coils and a respective one of the selected sensor coils by electromagnetic coupling; signal detecting means for detecting signals received by each of the selected sensor coils or each of the input coils; and calculating means for calculating coordinates and directions of each of the plurality of input elements in a three-dimensional space so that coordinates (X-coordinate, Y-coordinate, and Z-coordinate (height)) of the plurality of input elements in a three-dimensional space become continuous, based on the detection signals detected by the signal detecting means.

For example, the above described calculating means calculates, based on coordinates of any one of the plurality of input elements, coordinates of the others of the plurality of input elements. When the opposed ends of the plurality of input elements are directly connected so as to be relatively removable, the calculating means causes the coordinates of the end of any one of the plurality of input elements to conform to the coordinates of the end of another input element connected to the above-described input element. If opposed ends of the plurality of input elements are connected with each other so as to be relatively movable via a medium such as a cord, the calculating means may be arranged to calculate the coordinates of the end of another input element connected to the above-described input element, based on the coordinates of the end of any one of the plurality of input elements, allowing for the length of the medium.

The motion capture system according to the present invention has the memory 204 storing reference data to be referred to when calculating coordinates and directions of the plurality of input elements in a three-dimensional space, and the above-described calculating means thereof calculates the coordinates and the directions of the plurality of input elements in a three-dimensional space based on the detection signals detected by the signal detecting means, making reference to the reference data stored in the memory 204. Here, the above-described reference data is one used for calculating coordinates and directions of the plurality of input elements in a three-dimensional space, based on the detection signals detected by the signal detecting means. The reference data comprises characteristic data for calculating coordinates and directions of the plurality of input elements in a three-dimensional space based on the detection signals detected by the signal detecting means, and correction data for inhibiting the occurrence of detection errors.

Also, the motion capture system according to the embodiments of the invention is configured to have the memory 204 storing expressions used in calculating coordinates and directions of the plurality of input elements in a three-dimensional space, whereby the calculating means calculates coordinates and directions of the plurality of input elements in a three-dimensional space using the expressions stored in the memory 204, based on the detection signals detected by the signal detecting means.

Therefore, the motion capture system according to the embodiments of the present invention allows inexpensively capable of high-accuracy detection.

Furthermore, the motion capture detecting device according to the embodiments of the present invention is characterized by comprising a plurality of sensor coils that is disposed along a detection surface so as to intersect each other, and that is electromagnetically coupled to input coils of a plurality of input means; selecting means for selectively switching the sensor coils; signal generating means for generating signals to be communicated between the input coil and the selected sensor coil, by electromagnetic coupling; signal detecting means for detecting signals transmitted from the signal generating means and received by the selected sensor coil or the input coil; and calculating means for calculating coordinates and directions of each of the input means in a three-dimensional space, based on the signals detected by the signal detecting means.

The motion capture system according to the present invention has the memory 204 storing reference data to be referred to when calculating coordinates and directions of the plurality of input elements in a three-dimensional space, and the above-described calculating means thereof calculates the coordinates and the directions of the plurality of input elements in a three-dimensional space based on the detection signals detected by the signal detecting means, making reference to the reference data stored in the memory 204. Here, the above-described reference data is one used for calculating coordinates and directions of the plurality of input elements in a three-dimensional space, based on the detection signals detected by the signal detecting means. The reference data comprises characteristic data for calculating coordinates and directions of the plurality of input elements in a three-dimensional space based on the detection signals detected by the signal detecting means, and correction data for inhibiting the occurrence of detection errors.

Moreover, the motion capture system is configured to have the memory 204 storing expressions used in calculating coordinates and directions of the plurality of input elements in a three-dimensional space, whereby the calculating means calculates coordinates and directions of the plurality of input elements in a three-dimensional space using the expressions stored in the memory 204, based on the detection signals detected by the signal detecting means.

Therefore, the motion capture detection device according to the embodiments of the present invention makes it possible to construct a motion capture system that is inexpensive and capable of high-accuracy detection.

Furthermore, the motion capture input device according to the embodiments of the present invention especially has input coils for communicating signals with a plurality of sensor coils by electromagnetic coupling, and a plurality of input elements that are connected so as to be relatively movable.

Therefore, the motion capture input device according to the embodiments of the present invention enables a motion capture system that is inexpensive and capable of high-accuracy detection to be constructed.

Not only to motion capture systems, the present invention can be applied to various three-dimensional information detecting systems, three-dimensional information detecting devices, and input devices for the three-dimensional information detecting system that are arranged to input three-dimensional information about a position, directions and the like in a three-dimensional space using the input device, and to detect the three-dimensional information about the input device using the three-dimensional information detecting device.

As is evident from the foregoing, the three-dimensional information detecting system according to the present invention allows high-accuracy detection to be inexpensively achieved.

The three-dimensional information detection device according to the present invention makes it possible to construct a motion capture system that is inexpensive and capable of high-accuracy detection.

Also, the input device for the three-dimensional information detecting system according to the present invention makes it possible to construct a motion capture system that is inexpensive and capable of high-accuracy detection.

Having described preferred embodiments of a new and improved method and system, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An input device for a three-dimensional information detecting system, comprising:

- a plurality of input coils adapted to communicate signals with a plurality of sensor coils by electromagnetic coupling, and
- a plurality of input elements carrying said input coils, at least two of said input elements being flexibly connected to each other to be movable relative to one another.

2. The input device for a three-dimensional information detecting system according to claim 1, wherein a first input element has a single input coil.

3. The input device for a three-dimensional information detecting system according to claim 1, wherein at least one of said input elements has a plurality of input coils.

4. The input device for a three-dimensional information detecting system according to claim 3, wherein said plurality of input coils are disposed so that the central axes thereof orthogonally intersect each other.

5. The input device for a three-dimensional information detecting system according to claim 4, wherein the plurality of input coils are disposed so that the central positions thereof conform to each other.

6. The input device for a three-dimensional information detecting system according to claim 4, wherein at least one of the plurality of input coils is disposed so that the central position thereof deviates from those of the other input coils.

7. The input device for a three-dimensional information detecting system according to claim 1, wherein at least one of the input elements comprises a sphere, and wherein said input coil is disposed within the sphere.

8. The input device for a three-dimensional information detecting system according to claim 1, wherein each of the input coils is wound around a magnetic material.

9. The input device for a three-dimensional information detecting system according to claim 1, further comprising a plurality of resonant capacitors each connected to a respective input coils, wherein each resonant capacitor and input coil comprise an input coil resonant circuit having a unique resonant frequency differing from the resonant frequencies of the other input coil resonant circuits.

10. The input device for a three-dimensional information detecting system according to claim 9, further comprising a plurality of serial resonant circuits serially connected to the respective input coil resonant circuits and having the same resonant frequencies as those of the respective corresponding input coil resonant circuits.

11. The input device for a three-dimensional information detecting system according to claim 10, further comprising a transmitted signal generating circuit for exciting said serial resonant circuits.

12. The input device for a three-dimensional information detecting system according to claim 11, further comprising a battery for supplying a driving power to said transmitted signal generating circuit.

13. A three-dimensional information detecting device, comprising:

a plurality of sensor coils disposed along a detection surface and configured to intersect each other, said sensor coils being electromagnetically coupled to input coils of a plurality of input means, at least two of said input means being flexibly connected to each other to be movable relative to one another;

selecting means for selectively switching the sensor coils;

signal generating means for generating signals to be communicated between each of the input coils and a plurality of the selected sensor coils, by electromagnetic coupling;

signal detecting means for detecting signals transmitted from the signal generating means and received by each of the selected sensor coils or each of the input coils; and calculating means for calculating coordinates and directions of each of the input means in a three-dimensional space, based on the signals detected by the signal detecting means.

14. The three-dimensional information detecting device according to claim 13, wherein the calculating means determines an X-axis coordinate and a Y-axis coordinate of each of the input means, based on signals from at least three points in the vicinity of the peak value of the detection signals corresponding to each of the input means and detected by the detecting means, and wherein the calculating means determines a height of each of the input means from the width of a signal distribution at a predetermined level value of the detection signals.

15. The three-dimensional information detecting device according to claim 14, wherein the calculating means determines a tilt angle $\theta$ and an azimuth angle $\phi$ of each of the input means, based on the relationship between the detection signals corresponding to each of the input means, the detection signals having been detected by the detecting means.

16. The three-dimensional information detecting device according to claim 15, wherein the calculating means determines a tilt angle $\theta$ and an azimuth angle $\phi$ of each of the input means, based on the sub-signal ratio of detection signals corresponding to each of the input means.

17. The three-dimensional information detecting device according to claim 15, wherein the calculating means determines a tilt angle $\theta$ and an azimuth angle $\phi$ of each of the input means, based on the ratio of the left/right half side widths of detection signals corresponding to each of the input means.

18. The three-dimensional information detecting device according to claim 17, wherein the calculating means corrects the detected X-axis coordinate, Y-axis coordinate, and height of each of the input means, by using the tilt angle $\theta$ and the azimuthal angle $\phi$ that have been determined.

19. The three-dimensional information detecting device according to claim 18, wherein, based on the coordinates of a first input means, the calculating means calculates coordinates of each of the other input means.

20. The three-dimensional information detecting device according to claim 19, wherein the calculating means causes the coordinates of the end of said first input means to conform to the coordinates of the end of a second input means connected to said first input means.

21. The three-dimensional information detecting device according to any one of claim 20, further comprising a plurality of oblique sensor coils disposed to intersect one another and also intersect said sensor coils.

22. A three-dimensional information detecting system, comprising:

a plurality of input elements each having at least one input coil, at least one of said input elements being flexibly connected with another input element to be movable relative to one another;

a plurality of sensor coils disposed along a detection surface, at least two of said sensor coils being arranged to intersect one other, said sensor coils being electromagnetically coupled to at least one of the input coils;

a sensor coil selector circuit for selectively switching the sensor coils;

a signal generating circuit for generating a signal to be communicated between each of the input coils and selected sensor coils, by electromagnetic coupling;

a signal detector for detecting signals received by each of the selected sensor coils or each of the input coils; and a calculating means for calculating the coordinates and the direction of each of the plurality of input elements in a three-dimensional space, based on the detection signals detected by the signal detector.

23. The three-dimensional information detecting system according to claim 22, wherein at least one of the input elements has a sphere and an input coil disposed within the sphere.

24. The three-dimensional information detecting system according to claim 22, wherein the signal generating circuit generates signals having a plurality of frequencies corresponding to the respective input elements, and wherein signals of mutually different frequencies are communicated between each input element and a plurality of the selected sensor coils.

25. The three-dimensional information detecting system according to claim 22, wherein signals are transmitted from each of the input elements by supplying currents to each of the input elements from the signal generating circuit, and wherein the signal detector detects the signals generated in each of the sensor coils.

26. The three-dimensional information detecting system according to claim 22, wherein signals are transmitted from each of the sensor coils by supplying currents to each of the sensor coils from the signal generating circuit, and wherein the signal detector means detects the signals generated in each of said input elements.

27. The three-dimensional information detecting system according to claim 22, wherein signals are transmitted from each of the sensor coils by supplying currents to each of the sensor coils from the signal generating circuit, wherein after having received the signals, each of the input elements sends back the signals to a plurality of the sensor coils, and wherein the signal detector means detects the signals received by each of the sensor coils.

28. The three-dimensional information detecting system according to claim 22, further comprising a plurality of oblique sensor coils disposed along said detection surface and disposed to intersect one another and also intersect said detection surface sensor coils.

29. The three-dimensional information detecting system according to claim 22, wherein, based on coordinates for a first input element, the calculating means calculates coordinates for other input elements.

30. The three-dimensional information detecting system according to claim 29, wherein the calculating means causes the coordinates of the end of said first input element to conform to the coordinates of an end of a second input element connected to said first input element.

31. The three-dimensional information detecting system according to claim 22, wherein the input element includes an input coil.

32. The three-dimensional information detecting system according to claim 31 wherein the input coil is wound around a magnetic material.

33. The three-dimensional information detecting system according to claim 22, wherein the input element includes a plurality of input coils.

34. The three-dimensional information detecting system according to claim 33, wherein said plurality of input coils are disposed so that the central axes thereof orthogonally intersect one another.

35. The three-dimensional information detecting system according to claim 34, wherein said plurality of input coils are disposed so that the central positions thereof conform to each other.

36. The three-dimensional information detecting system according to claim 34, wherein at least one of the plurality of input coils is disposed so that the central position thereof deviates from those of the other input coils.

37. The three-dimensional information detecting system according to claim 22, wherein the calculating means calculates an X-axis coordinate and a Y-axis coordinate of each input element, based on signals from at least three points in the vicinity of the peak value of the detection signals corresponding to each input element and detected by the detector, and wherein the calculating means determines a height of each input element from the width of a signal distribution at a predetermined level value of the detection signals.

38. The three-dimensional information detecting system according to claim 37, wherein the calculating means determines a tilt angle θ and an azimuth angle ϕ for each input element based on the relationship between detection signals corresponding to each input element, the detection signals having been detected by the signal detector.

39. The three-dimensional information detecting system according to claim 38, wherein the calculating means determines a tilt angle θ and an azimuth angle ϕ for each input element based on the sub-signal ratio of detection signals corresponding to each input element.

40. The three-dimensional information detecting system according to claim 38, wherein the calculating means determines a tilt angle θ and an azimuth angle ϕ of each input element based on the ratio of left/right half side widths of detection signals corresponding to each input element.

41. The three-dimensional information detecting system according to claim 38, wherein the calculating means corrects the detected X-axis coordinate, Y-axis coordinate, and height of each input element by using the tilt angle θ and the azimuthal angle ϕ that have been determined.

* * * * *